United States Patent
Eichholz et al.

(10) Patent No.: US 11,780,765 B2
(45) Date of Patent: Oct. 10, 2023

(54) PRESTRESS BY USE OF A GRADIENT MATERIAL

(71) Applicant: Schott AG, Mainz (DE)

(72) Inventors: Rainer Erwin Eichholz, Frankfurt am Main (DE); Markus Ollig, Weiden (DE); Arne Riecke, Waldsassen (DE); Ulrich Fotheringham, Wiesbaden (DE)

(73) Assignee: Schott AG, Mainz (DE)

(*) Notice: Subject to any disclaimer, the term of this patent is extended or adjusted under 35 U.S.C. 154(b) by 331 days.

(21) Appl. No.: 17/316,150

(22) Filed: May 10, 2021

(65) Prior Publication Data

US 2021/0347681 A1 Nov. 11, 2021

(30) Foreign Application Priority Data

May 8, 2020 (EP) .................................. 20173744

(51) Int. Cl.
*B32B 15/04* (2006.01)
*B32B 17/06* (2006.01)
*C03C 3/11* (2006.01)
*C03C 3/064* (2006.01)
*C03C 3/089* (2006.01)

(52) U.S. Cl.
CPC .............. *C03C 3/111* (2013.01); *C03C 3/064* (2013.01); *C03C 3/089* (2013.01); *C03C 2201/32* (2013.01); *C03C 2201/58* (2013.01)

(58) Field of Classification Search
CPC ................................ C03C 3/089; C03C 3/064

USPC .......................................................... 428/428
See application file for complete search history.

(56) References Cited

U.S. PATENT DOCUMENTS

| | | | |
|---|---|---|---|
| 9,902,138 B2 * | 2/2018 | Edwards | H10K 50/841 |
| 2007/0190340 A1 * | 8/2007 | Coppola | C03B 17/064 |
| | | | 428/432 |
| 2015/0147575 A1 * | 5/2015 | Dejneka | C03C 3/097 |
| | | | 501/63 |
| 2017/0217825 A1 * | 8/2017 | Hasegawa | C03C 3/087 |
| 2018/0222790 A1 * | 8/2018 | Fotheringham | C03C 3/093 |
| 2018/0222791 A1 * | 8/2018 | Fotheringham | C03C 3/093 |
| 2020/0010353 A1 * | 1/2020 | Fotheringham | C03C 4/20 |
| 2020/0010355 A1 * | 1/2020 | Fotheringham | C03C 4/20 |
| 2020/0010356 A1 * | 1/2020 | Fotheringham | C03C 3/112 |
| 2022/0411316 A1 * | 12/2022 | Fotheringham | C03C 3/091 |

FOREIGN PATENT DOCUMENTS

DE    10 014 101 756 A1    8/2015

OTHER PUBLICATIONS

Extended European Search Report dated Jun. 8, 2021 for European Patent Application No. 21172700.3 (8 pages).

* cited by examiner

Primary Examiner — Lauren R Colgan
(74) Attorney, Agent, or Firm — Taylor IP, P.C.

(57) ABSTRACT

The invention relates to glass articles, such as for example glass tubes or flat glasses, where the material at the surface by a targeted process control has gradient material properties which in turn result in a compressive prestress of the surface. The invention also relates to a method for the production of the glass articles as well as their use.

20 Claims, No Drawings

PRESTRESS BY USE OF A GRADIENT MATERIAL

CROSS REFERENCE TO RELATED APPLICATIONS

This application claims priority to European Patent Application No. EP 20173744.2 filed on May 8, 2020, which is incorporated in its entirety herein by reference.

BACKGROUND OF THE INVENTION

1. Field of the Invention

The invention relates to glass articles, such as, for example, glass tubes or flat glasses, where the material at the surface by a targeted process control has gradient material properties which in turn result in a compressive prestress of the surface. The invention also relates to a method for the production of the glass articles as well as their use.

2. Description of the Related Art

Glasses with compressive prestress at the surface are required for many applications, in particularly for applications in the field of safety glass or generally for glasses which are more resistant against mechanical influences than glasses without prestress. There are different methods for providing compressive prestress at the surfaces of glass products.

During the so-called chemical tempering, see i.a. Arun K. Varshneya, Chemical Strengthening of Glass: Lessons Learned and Yet To Be Learned, International Journal of Applied Glass Science 1 [2] 131-142 (2010), smaller ions which are present in the glass surface, e.g. sodium ions, are replaced by larger ions, e.g. potassium ions. This results in a larger required space at the surface relative to the core material. By the connection with the core material the surface is prevented from this expansion and it is compressed to the original dimension which results in corresponding compressive stresses. Typically, the chemical tempering process is conducted at high temperatures, but still well below the annealing temperature $T_G$.

During the so-called thermal tempering, see i.a. Werner Kiefer, Thermisches Vorspannen von Gläsern niedriger Wärmeausdehnung, Glastechnische Berichte 57 (1984), no. 9, p. 221-228, the glass product, such as for example a flat glass, is heated to a temperature of, for example, 100 K above the annealing temperature $T_G$, and then it is abruptly cooled by blowing onto it or the like. Through the interplay of locally different cooling (quick at the surface, slow in the core due to the low thermal conductivity of the glass), the locally different thermal expansion resulting thereof, the stress build-up which in turn results thereof and the following stress relaxation which strongly depends on the temperature a compressive prestress at the surface (thermal prestress) is generated.

According to the Technical Information Exchange No. 32 (TIE-32), Thermal loads on optical glass, Schott AG, Mainz, Germany, October 2018, the thermal prestress σ of a glass pane is $$\sigma = f \cdot \frac{\Delta T \cdot CTE \cdot E}{1 - \mu} \quad (1)$$

Here, E is the modulus of elasticity, μ is the Poisson ratio and ΔT is the difference between the surface temperature and the core temperature of the pane at the moment, when the core temperature during the abrupt cooling passes the annealing temperature. CTE is the coefficient of thermal expansion of the glass. "f" is a factor which describes the ratio between the difference of surface temperature and mean pane temperature to the difference between surface temperature and core temperature. In every case, "f" is smaller than 1; wherein for the case that until passing of the glass transition range a "steady state" with parabolic temperature profile has been formed, the following is true: f=2/3.

For ΔT according to Kiefer, loc. cit., the following is true:

$$\Delta T = \frac{h \cdot d}{4 \cdot k + h \cdot d} \cdot (T_G - T_{ambient}) \quad (2)$$

Here, h is the coefficient of heat transfer between the pane and the cooling medium, such as for example blowing air, d is the thickness of the pane, κ is the thermal conductivity of the glass and $T_{ambient}$ is the temperature of the cooling medium or the ambient temperature, respectively.

These two processes can be used for both, panes and also other glass products; wherein the mentioned considerations always apply to the case that the thickness of a piece of such a glass product which is considered each is small in comparison to its lateral dimensions. This is true not only in the case of panes, but also in particularly in the case of tubes, bottles or the like. But both processes require an additional process step which is connected with a reheating of the glass and a considerable chemical or engineering effort.

A possible alternative to both methods would arise in a case, when during the production in a surface layer the composition is changed such that there a lower CTE than in the interior results. Under the assumption that, firstly, during a cooling process down to the annealing temperature $T_G$ all stresses originating from different thermal expansions completely relax and at lower temperatures no longer at all, and that, secondly, the thickness of the surface layer is small in comparison to the thickness of the considered glass piece, from Hooke's law for two-dimensional stress states for the compressive prestress at the surface the following results:

$$\sigma_O = \frac{(T_G - T_{ambient}) \cdot \Delta CTE \cdot E}{1 - \mu} \quad (3)$$

Here, ΔCTE is the difference between the coefficients of thermal expansion in the core $CTE_K$ and at the surface $CTE_O$.

According to the present invention, "surface" means a portion of the glass which is near the interface glass/air. Here, the glass which forms the surface is referred to as "surface glass"; and the residual glass which is nearer to the interior here is referred to as "bulk glass" or "core glass". An exact differentiation between surface and bulk is difficult, therefore for this invention it is defined that the surface glass is present down to a depth of <20 nm. The surface analysis of the composition may in particularly be conducted by TOF-SIMS. As surface value the mean value of the near surface measurements down to a depth of <20 nm each is used and the composition in constituent phases is determined with the help of the inverse matrix from the oxide composition. 5 or 6 single measurements in different depths starting at a depth of ca. 5 nm down to a depth of <20 nm may be conducted. The single measurements may be equidistant with respect to the depth. For example, single measurements at a depth of about 6 nm, 9 nm, 12 nm, 15 nm and 18 nm or single measurements at a depth of about 5 nm, 7.5 nm, 10 nm, 12.5 nm, 15 nm and 17.5 nm can be conducted. Here, the exact depth of the single measurement is not crucial. On the basis of the so determined composition of the surface glass the properties of the surface glass are determined by calculation with the help of the formulas discussed here. The composition of the core glass can be determined with a conventional chemical analysis of the glass composition, since the glass composition in a greater depth is not changed by the production. In every case, core glass is present in a depth of 500 nm. By certain measures during the glass production the surface can advantageously be influenced. The composition of the surface glass down to a depth of <20 nm can be measured by Cs-TOF-SIMS at 1000 eV. The TOF-SIMS measuring values may be normalized with the help of the values of the chemical analysis of the core glass. For example, the results of the TOF-SIMS can be extrapolated into the direction of the surface (the same signal strength means the same mass flow). Thus, a concentration in % may be assigned to a certain TOF-SIMS signal strength of the core glass (determined, for example, in a depth of 500 nm, 600 nm or 700 nm), and exactly that concentration which corresponds to the concentration of the chemical analysis of the glass. Also the mean value of TOF-SIMS signal strengths of the core glass in different depths can be used, such as for example the mean value of the signal strengths in a depth of 500 nm, 600 nm and 700 nm. With TOF-SIMS, in particularly, the signal strengths for Si, B, Al, Na, K, Mg and Ca are determined. These values are extrapolated towards the surface, wherein this means: when a signal strength of x is obtained which corresponds to a concentration of 20%, and at the surface in fact x is measured, then the surface concentration at first is also set equal to 20%. When at the surface instead of the value x the value 2x is measured, then the surface concentration is set equal to 40%. Subsequently, the surface concentrations so determined may be normalized such that their sum amounts to 100%.

SUMMARY OF THE INVENTION

Exemplary embodiments provided according to the invention provide a method with which glass products at the surface can be provided with compressive prestress by a modification of the production method in a quasi "inline" manner.

In some exemplary embodiments provided according to the invention, a glass article includes a core glass and a surface glass. The surface glass is present down to a depth of <20 nm and the core glass is present at least in a depth of 500 nm. The core glass is characterized by the following constituent phases of the core glass:

| Constituent phase | Min. (% by mol) | Max. (% by mol) |
|---|---|---|
| reedmergnerite | 10 | 80 |
| potassium reedmergnerite | 0 | 30 |
| albite | 0 | 50 |
| cordierite | 0 | 10 |
| anorthite | 0 | 25 |

-continued

| Constituent phase | Min. (% by mol) | Max. (% by mol) |
|---|---|---|
| diboron trioxide | 0 | 20 |
| silicon dioxide | 5 | 60 |

The surface glass is characterized by the following constituent phases of the surface glass:

| Constituent phase | Min. (% by mol) | Max. (% by mol) |
|---|---|---|
| reedmergnerite | 2 | 60 |
| potassium reedmergnerite | 0 | 40 |
| albite | 0 | 70 |
| cordierite | 0 | 10 |
| anorthite | 0 | 20 |
| diboron trioxide | 0 | 15 |
| silicon dioxide | 6 | 80 |

The core glass has a $CTE_K$ calculated according to the following formula (14) in a range of 3.0 to 7.0 ppm/K, and the surface glass has a $CTE_O$ calculated according to the following formula (14) which in comparison to the $CTE_K$ of the core glass calculated according to the following formula (14) is lower by at least 0.6 ppm/K:

$$CTE_{glass} = \left( \frac{50116.33042 \left( \frac{kJ}{mol} \right)}{\overline{E_{pot}}} - 26.1724514 \right) \text{ppm/K}; \quad (4)$$

where $\overline{E_{pot}}$ is a depth of potential well.

DETAILED DESCRIPTION OF THE INVENTION

Exemplary embodiments provided according to the invention provide a targeted combination of a production method and suitable glasses. The quintessence of the production method is a change of the surface composition in comparison to the core composition by a targeted removal of single components. So, glass articles are obtained which comprise a surface glass having a changed composition in comparison to the core glass so that the coefficient of thermal expansion at the surface and in the core is different.

The suitable glasses in turn for their part are described in the following as a combination of stoichiometric glasses, thus glasses which in the same stoichiometry also exist as crystals and the property of which can be assumed as being very similar each for glass and crystal due to the identical topology of the assemblies—such as verified in a lot of examples in literature by NMR measurements or the like. For this, special stoichiometric glasses are selected, wherein with the mixture thereof a behavior in the sense of a solution provided according to the present invention can be attained. In this application, these stoichiometric glasses are also referred to as "base glasses" or "constituent phases".

It is not a new concept to describe glasses by the constituent phases to be assigned to them. By specifying the base glasses it is possible to draw conclusions with respect to the chemical structure of a glass (cf. Conradt R: "Chemical structure, medium range order, and crystalline reference state of multicomponent oxide liquids and glasses", in Journal of Non-Crystalline Solids, volumes 345-346, 15 Oct. 2004, pages 16-23).

The present invention relates to a glass having a composition which is characterized by the following constituent phases of the glass:

TABLE 1

| Constituent phase | Min. (% by mol) | Max. (% by mol) |
|---|---|---|
| reedmergnerite | 10 | 80 |
| potassium reedmergnerite | 0 | 30 |
| albite | 0 | 50 |
| cordierite | 0 | 10 |
| anorthite | 0 | 25 |
| diboron trioxide | 0 | 20 |
| silicon dioxide | 5 | 60 |

In some embodiments, the invention relates to a glass article, comprising a core glass and a surface glass, wherein the surface glass is present down to a depth of <20 nm and the core glass is at least present in a depth of 500 nm, wherein the core glass is characterized by the following constituent phases of the core glass:

| Constituent phase | Min. (% by mol) | Max. (% by mol) |
|---|---|---|
| reedmergnerite | 10 | 80 |
| potassium reedmergnerite | 0 | 30 |
| albite | 0 | 50 |
| cordierite | 0 | 10 |
| anorthite | 0 | 25 |
| diboron trioxide | 0 | 20 |
| silicon dioxide | 5 | 60 | wherein the surface glass is characterized by the following constituent phases of the surface glass:

| Constituent phase | Min. (% by mol) | Max. (% by mol) |
|---|---|---|
| reedmergnerite | 2 | 60 |
| potassium reedmergnerite | 0 | 40 |
| albite | 0 | 70 |
| cordierite | 0 | 10 |
| anorthite | 0 | 20 |
| diboron trioxide | 0 | 15 |
| silicon dioxide | 6 | 80 | wherein the core glass has a $CTE_K$ calculated according to formula (14) in a range of 3.0 to 7.0 ppm/K, and wherein the surface glass has a $CTE_O$ calculated according to formula (14) which in comparison to the $CTE_K$ of the core glass calculated according to formula (14) is lower by at least 0.6 ppm/K.

The glass article provided according to the present invention may, for example, be a glass tube or a pharmaceutical container (such as for example a bottle, ampoule, carpule or syringe). The outer diameter may be in a range of 2 mm to 465 mm, such as for example of 3 mm to 180 mm or of 5 to 65 mm or of 10 to 50 mm. The outer diameter may, for example, be at least 5 mm or at least 10 mm. The outer diameter may, for example, be at most 180 mm, at most 65 mm or at most 50 mm. The wall thickness may be in a range of 0.1 mm to 7 mm, such as for example of 0.2 mm to 3.0 mm or of 0.2 mm to 2.0 mm. The wall thickness may, for example, be at least 0.1 mm or at least 0.2 mm. The wall thickness may, for example, be at most 3.0 mm or at most 2.0 mm. The ratio of outer diameter to wall thickness may be in a range of 3:1 to 70:1, such as for example of 5:1 to 50:1, of 10:1 to 40:1, or of 20:1 to 30:1. The ratio of outer diameter to wall thickness may, for example, be at least 10:1, at least 15:1, or at least 20:1. The ratio of outer diameter to wall thickness may, for example, be at most 50:1, at most 40:1, or at most 30:1.

The glass article may comprise an inner and an outer surface, for example, when the article is in the form of a tube or a container such as a bottle. In some embodiments, the surface glass provided according to the present invention is exclusively localized at the outer surface. Thus, the inner surface in contrast to the outer surface may be characterized by the same portions of the constituent phases such as the core glass.

In some embodiments, the surface glass provided according to the present invention is present at at least 50%, such as at least 75%, at least 90%, at least 95%, or at least 99% of the outer surface of the glass article. In some embodiments, the surface glass provided according to the present invention is present at the whole outer surface.

Furthermore, the glass provided according to the present invention may fulfill further conditions which are associated via formulas with the composition based on constituent phases, wherein these relationships are explained further herein.

At first, we specify a conversion matrix for the conversion of the composition data of constituent phases in simple oxides.

Conversion of the Composition Based on Constituent Phases into the Composition Based on Simple Oxides and Vice Versa The composition in constituent phases is given for the purpose of conversion in the following normalized form:

TABLE 2

| Constituent phase | Formula (normalized with respect to a simple oxide) |
|---|---|
| reedmergnerite | $(Na_2O \cdot B_2O_3 \cdot 6SiO_2)/8$ |
| potassium reedmergnerite | $(K_2O \cdot B_2O_3 \cdot 6SiO_2)/8$ |
| albite | $(Na_2O \cdot Al_2O_3 \cdot 6SiO_2)/8$ |
| cordierite | $(2MgO \cdot 2Al_2O_3 \cdot 5SiO_2)/9$ |
| anorthite | $(CaO \cdot Al_2O_3 \cdot 2SiO_2)/4$ |
| diboron trioxide | $B_2O_3$ |
| silicon dioxide | $SiO_2$ |

The conversion of these compositions into composition data in % by mol with respect to the following simple oxides . . .

| # | Oxide |
|---|---|
| 1. | $SiO_2$ |
| 2. | $B_2O_3$ |
| 3. | $Al_2O_3$ |
| 4. | MgO |
| 5. | CaO |
| 6. | $Na_2O$ |
| 7. | $K_2O$ |

. . . is conducted with the help of the matrix given here. In this case, the matrix on its right side is multiplied with the composition data in % by mol with respect to the base glasses as column vector:

| | | | | Matrix | | | |
|---|---|---|---|---|---|---|---|
| 6/8 | 6/8 | 6/8 | 5/9 | 2/4 | 0 | 1 | x (Na$_2$O•B$_2$O$_3$•6SiO$_2$)/8 |
| 1/8 | 1/8 | 0 | 0 | 0 | 1 | 0 | (K$_2$O•B$_2$O$_3$•6SiO$_2$)/8 |
| 0 | 0 | 1/8 | 2/9 | 1/4 | 0 | 0 | (Na$_2$O•Al$_2$O$_3$•6SiO$_2$)/8 |
| 0 | 0 | 0 | 2/9 | 0 | 0 | 0 | (2MgO•2Al$_2$O$_3$•5SiO$_2$)/9 |
| 0 | 0 | 0 | 0 | 1/4 | 0 | 0 | (CaO•Al$_2$O$_3$•2SiO$_2$)/4 |
| 1/8 | 0 | 1/8 | 0 | 0 | 0 | 0 | B$_2$O$_3$ |
| 0 | 1/8 | 0 | 0 | 0 | 0 | 0 | SiO$_2$ |

As a result of the multiplication of the column vector with the matrix the composition of the glass in percent by mol is obtained.

Conversely, a composition in percent by mol can simply be converted via the respective inverse matrix into a base glass composition. Here, of course, only such base glass compositions are provided according to the present invention which, when converted, do not result in negative values for the base glasses.

In the following, the further conditions which should be fulfilled by the glasses provided according to the present invention and which, partly, are associated via formulas with the composition based on constituent phases, in particularly certain surface properties, are specified.

For being able to exactly describe these surface properties, at first, the derivation of the equations (3) including the assumptions made during that has to be reported.

In the derivation of (3), at first, it is assumed that during a process of cooling to the annealing temperature all stresses instantaneously relax and, starting at the annealing temperature, no longer at all relax, according to the approximation of Franz Simon, Über den Zustand der unterkühlten Flüssigkeiten und Gläser, Zeitschrift für anorganische und allgemeine Chemie 203, no. 1 (1931), p. 219-227. Then, from the difference between the coefficient of expansion at the surface and in the core at room temperature, here referred to as $T_{ambient}$, a relative distortion $(T_G-T_{ambient}) \cdot \Delta CTE$ of the surface and the core material results. In equilibrium, in the surface a compressive prestress $\sigma_O$ prevails and in the core a tensile prestress $\sigma_K$ prevails, which due to the equilibrium condition $$0 = \int_0^a \sigma(z) dz \quad (5)$$

have to fulfill the following formula (5):

$$0 = \sigma_O \cdot d_O + \sigma_k \cdot \left(\frac{a}{2} - d_O\right) \quad (6)$$

Here, the integral in (4) in the normal direction summarizes values over the pane thickness a, and $d_O$ is the thickness of the surface layer.

In the case of a plane stress state, the following applies to the relationship between distortion ε and stress σ:

$$\sigma = -\varepsilon \cdot \frac{E}{1-\mu} \quad (7)$$

so that the following is true:

$$0 = \varepsilon_O \cdot d_O + \varepsilon_K \cdot \left(\frac{a}{2} - d_O\right) \quad (8)$$

wherein $\varepsilon_O$ is the distortion at the surface and $\varepsilon_K$ is the distortion in the core.

As already mentioned above, for the relative distortion of surface and core, thus $\varepsilon_O - \varepsilon_K$, the following relationship is true:

$$\varepsilon_O - \varepsilon_K = -(T_G - T_{ambient}) \cdot \Delta CTE \quad (9)$$

When now, in addition, it is assumed that the surface layer with the changed CTE is much thinner than the core of the glass, $\varepsilon_K$ can be neglected, and it is possible to state:

$$\varepsilon_O \approx -(T_G - T_{ambient}) \cdot \Delta CTE \quad (10)$$

and $$\sigma_O = \frac{E}{1-\mu} \cdot (T_G - T_{ambient}) \cdot \Delta CTE \quad (11)$$

For the conversion of (9) into (10) approximately it is assumed that the modulus of elasticity E and the Poisson ratio μ only in a low and here neglectable extent depend on the composition, whereas the CTE strongly depends on the composition. This assumption is in line with the properties of common technical glasses, see Schott, Technical Glasses, Physical and Technical Properties, Mainz, 2014, https://www.us.schott.com/d/epackaging/0ad24277-2ace-4d9a-999d-736ed389f6cc/1.3/18.11.15_final_schott_technical_glasses_us.pdf.

The equation (10) can directly be generalized with respect to the case that the CTE near the surface has a course which depends on the depth z. The only prerequisite is that the thickness of the surface layer in which the CTE is different from the value of the CTE in the core region is small in comparison to the total thickness of the pane. Then, the following results:

$$\sigma(z) = \frac{E}{1-\mu} \cdot (T_G - T_{ambient}) \cdot (CTE_K - CTE(z)) \quad (12)$$

According to the present invention are glass products such as tubes or panes, where near the surface by a variation of the CTE with the depth z either a step-like or a continuous course of the stress is formed, with a zone of tensile stress in the core of the glass product and a zone of (a course of) compressive stress at the surface.

When in (10) the values E=72 GPa, μ=0.2 and $T_G$=575° C. which are typical for technical glasses that are used, and when $T_{ambient}$=25° C., then the following is obtained:

$$\sigma_O = 49500 \text{ GPa} \cdot K \cdot \Delta CTE \quad (13)$$

Thus, a ΔCTE of 0.5 ppm/K results in $\sigma_O$=25 MPa, a ΔCTE of 1 ppm/K results in $\sigma_O$=50 MPa, etc.

This value, thus 50 MPa, is in the order of magnitude of a compressive prestress which can directly be measured at the surface of a so-called partially prestressed glass (40-60 MPa, see B. Weller, S. Tasche, Glasbau; in: Wendehorst Bautechnische Zahlentafeln, ed.: O. W. Wetzell, 32$^{nd}$ edition, 2007; citation according to K.-Ch. Thienel, script for the lecture "Werkstoffe des Bauwesens/Glas", Institut für Werkstoffe des Bauwesens, Fakultät für Bauingenieur-und Vermessungswesen, Universität der Bundeswehr München, spring trisemester 2018, www.unibw.de>lehre>skripte-werkstoffe>glas-2018.pdf).

Values of compressive prestress of this order of magnitude are the target of the present invention. Compressive prestresses increase the strength, i.a. by the compression of cracks, the depth of which is in the order of magnitude of the thickness of the compressive stress zone. With a compressive prestress zone having a thickness in the two-digit nanometer range, for example, it is possible to compress the cracks having depths of 1 nm to 10 nm which are typical for freshly drawn glass, and with a compressive prestress zone having a thickness in the three-digit nanometer range, for example, it is possible to compress the cracks having depths of 100 nm which are typical for freshly drawn and then (e.g. for stress relaxation) thermally treated glass, see R. E. Mould, The Strength of Inorganic Glasses, in: Fundamental Phenomena in the Materials Sciences, editor L. J. Bonis, J. J. Duga and J. J. Gilman, 119-149 (1967), citation according to Hong Li, Strength of Glass and Glass Fiber, Invited presentation, 76$^{th}$ Conference on Glass Problems, GMIC, Alfred University, Am. Ceram. Soc. (Columbus, Ohio, Nov. 2-5, 2015), https://www.researchgate.net/publication/303099608_Strength_of_Glass_and_Glass_Fibers.

Cracks of the mentioned orders of magnitude can, in particularly, not be neglected, when it is succeeded to perform the handling of component parts according to the present invention, such as tubes or vials, such that this handling does not result in (in the literal sense) deeper damages of the glass.

Thus, provided according to the present invention are glass products, the composition of which in the core and possibly also in the surface region is in the composition range given in Table 1 and for which the difference $CTE_K - CTE_O$ is at least 0.6 ppm/K, such as at least 0.8 ppm/K, at least 1 ppm/K, or at least 1.2 ppm/K.

This difference is determined by the compositions in the regions of core and surface from which the respective coefficients of expansion follow, as well as the combination of composition and production method from which in turn the difference of the compositions of core and surface results.

Since it is possible to calculate the coefficient of thermal expansion via the mean binding strength from the composition in very good approximation, here the so calculated values are used. $CTE_K$ and $CTE_O$ are calculated from the determined composition in constituent phases in the core glass and surface glass, respectively, according to formula (14).

In the above calculation example, for the quotient of the elastic modulus and the parameter (1-µ) typical values have been used.

Provided according to the present invention are glass products, the composition of which in the core and possibly also in the surface region is in the composition range given in Table 1 and for which the quotient of the elastic modulus and the parameter (1-µ) is at least 80 GPa, such as at least 85 GPa.

However, decisive for the compressive prestress at the surface is not the quotient of the elastic modulus and the parameter (1-µ) in the core region, but at the surface. Therefore, in some embodiments, this quotient despite the different compositions in the core and at the surface does not strongly change.

Provided, thus, according to the present invention are glass products, the composition of which in the core and possibly also in the surface region is in the composition range given in Table 1 and for which the quotient of the elastic modulus and the parameter (1-µ) at the surface in comparison to the respective quotient in the core differs in an extent of at most 10%, such as of at most 8%, of at most 6%, or of at most 4%.

Since it is also possible to calculate the elastic modulus in very good approximation via the mean binding strength from the composition and it is also possible to calculate in very good approximation the Poisson ratio from the packing density and the cross-linking numbers, in the following, the values which are calculated such are used (formulas (29) and (27)).

In some embodiments, the quotient $Q_K$ of the elastic modulus E and the parameter (1-µ) calculated with the help of the formulas (29) and (27) from the composition of the core glass in constituent phases is in a range of 80 GPa to 105 GPa, such as of 85 GPa to 100 Ga, or of 90 GPa to 95 GPa. In some embodiments, the quotient $Q_K$ of the elastic modulus E and the parameter (1-µ) calculated with the help of the formulas (29) and (27) from the composition of the core glass in constituent phases is at least 80 GPa, at least 85 GPa or at least 90 GPa. In some embodiments, the quotient $Q_K$ of the elastic modulus E and the parameter (1-µ) calculated with the help of the formulas (29) and (27) from the composition of the core glass in constituent phases is at most 105 GPa, at most 100 GPa or at most 95 GPa. E can be calculated with the help of formula (29) and µ can be calculated with the help of formula (27). The quotient of E and (1-µ) can easily be formed with the help of the values obtained for E and µ. Such as explained above, despite the different compositions, the quotient in the core should not strongly differ from the respective quotient at the surface. In some embodiments, the quotient $Q_O$ of the elastic modulus and the parameter (1-µ) calculated with the help of the formulas (29) and (27) from the composition of the surface glass in constituent phases corresponds to the quotient $Q_K \pm 10\%$, such as $Q_K \pm 8\%$, $Q_K \pm 6\%$, or $Q_K \pm 4\%$. In some embodiments, the quotient $Q_O$ of the elastic modulus and the parameter (1-µ) calculated with the help of the formulas (29) and (27) from the composition of the surface glass in constituent phases is at least $Q_K - 10\%$, such as at least $Q_K - 8\%$, at least $Q_K - 6\%$, or at least $Q_K - 4\%$. In some embodiments, the quotient $Q_O$ of the elastic modulus and the parameter (1-µ) calculated with the help of the formulas (29) and (27) from the composition of the surface glass in constituent phases is at most $Q_K + 10\%$, such as at most $Q_K 8\%$, at most $Q_K + 6\%$, or at most $Q_K + 4\%$.

Furthermore, provided according to the present invention are glass products, the composition of which in the core and possibly also in the surface region is in the composition range given in Table 1 and for which the $T_G$ is at least 564° C., such as 566° C., 568° C., 570° C., 572° C., or 574° C.

Since it is also possible to calculate the annealing temperature $T_G$ in very good approximation via the mean binding strength and the number of angle degrees of freedom per atom from the composition, here the values which are calculated such are used (formulas (35) and (33)).

In some embodiments, the processing temperature $VA_K$ calculated according to formula (33) from the composition of the core glass in constituent phases is in a range of 1120° C. to 1280° C., such as of 1150° C. to 1250° C., of 1180° C. to 1230° C., or of 1190° C. to 1220° C. In some embodiments, the processing temperature $VA_K$ calculated according to formula (33) from the composition of the core glass in constituent phases is at least 1120° C., such as at least 1150° C., at least 1180° C., or at least 1190° C. In some embodiments, the processing temperature $VA_K$ calculated according to formula (33) from the composition of the core glass in constituent phases is at most 1280° C., such as at most 1250° C., at most 1230° C., or at most 1220° C. In some embodiments, the processing temperature $VA_O$ calculated with the help of formula (33) from the composition of the surface glass in constituent phases corresponds to the processing temperature $VA_K \pm 10\%$, such as $VA_K \pm 8\%$, $VA_K \pm 6\%$, or $VA_K \pm 4\%$. In some embodiments, the processing temperature $VA_O$ calculated with the help of formula (33) from the composition of the surface glass in constituent phases is at least $VA_K-10\%$, such as at least $VA_K-8\%$, at least $VA_K-6\%$, or at least $VA_K-4\%$. In some embodiments, the processing temperature $VA_O$ calculated with the help of formula (33) from the composition of the surface glass in constituent phases is at most $VA_K+10\%$, such as at most $VA_K+8\%$, at most $VA_K+6\%$, or at most $VA_K+4\%$.

In some embodiments, the annealing temperature $T_{G(K)}$ calculated according to formula (35) from the composition of the core glass in constituent phases is in a range of 540° C. to 650° C., such as of 550° C. to 640° C., of 560° C. to 630° C., of 570° C. to 620° C., of 580° C. to 610° C., or of 590° C. to 600° C. In some embodiments, the annealing temperature $T_{G(K)}$ calculated according to formula (35) from the composition of the core glass in constituent phases is at least 540° C., such as at least 550° C., at least 560° C., at least 570° C., at least 580° C., or at least 590° C. In some embodiments, the annealing temperature $T_{G(K)}$ calculated according to formula (35) from the composition of the core glass in constituent phases is at most 650° C., such as at most 640° C., at most 630° C., at most 620° C., at most 610° C., or at most 600° C. In some embodiments, the annealing temperature $T_{G(O)}$ calculated with the help of formula (35) from the composition of the surface glass in constituent phases corresponds to the annealing temperature $T_{G(K)} \pm 10\%$, such as $T_{G(K)} \pm 8\%$, $T_{G(K)} \pm 6\%$, or $T_{G(K)} \pm 4\%$. In some embodiments, the annealing temperature $T_{G(O)}$ calculated with the help of formula (35) from the composition of the surface glass in constituent phases is at least $T_{G(K)}-10\%$, such as at least $T_{G(K)}-8\%$, at least $T_{G(K)}-6\%$, or at least $T_{G(K)}-4\%$. In some embodiments, the annealing temperature $T_{G(O)}$ calculated with the help of formula (35) from the composition of the surface glass in constituent phases is at most $T_{G(K)}+10\%$, such as at most $T_{G(K)}+8\%$, at most $T_{G(K)}+6\%$, or at most $T_{G(K)}+4\%$.

In some embodiments, the compressive prestress at the surface $\sigma_O$ calculated according to formula (10) is in a range of 25 to 85 MPa, such as of 30 to 80 MPa, of 35 to 75 MPa, of 40 to 70 MPa, such as for example 45 to 65 MPa or 50 to 60 MPa, when the quotient of the elastic modulus and the parameter (1-µ) is calculated with the help of the formulas (29) and (27) from the composition of the core glass in constituent phases, when the annealing temperature $T_G$ is calculated according to formula (35) from the composition of the core glass in constituent phases, when $\Delta$CTE is calculated as the difference between the $CTE_K$ calculated according to formula (14) and the $CTE_O$ calculated according to formula (14), and when $T_{ambient}=25°$ C. is assumed. In some embodiments, the compressive prestress at the surface $\sigma_O$ calculated such according to formula (10) is at least 25 MPa, such as at least 30 MPa, at least 35 MPa, or at least 40 MPa, such as for example at least 45 MPa or at least 50 MPa, when the quotient of the elastic modulus and the parameter (1-µ) is calculated with the help of the formulas (29) and (27) from the composition of the core glass in constituent phases, when the annealing temperature $T_G$ is calculated according to formula (35) from the composition of the core glass in constituent phases, when $\Delta$CTE is calculated as the difference between the $CTE_K$ calculated according to formula (14) and the $CTE_O$ calculated according to formula (14), and when $T_{ambient}=25°$ C. is assumed. In some embodiments, the compressive prestress at the surface $\sigma_O$ calculated such according to formula (10) is at most 85 MPa, such as at most 80 MPa, at most 75 MPa, or at most 70 MPa, such as for example at most 65 MPa or at most 60 MPa, when the quotient of the elastic modulus and the parameter (1-µ) is calculated with the help of the formulas (29) and (27) from the composition of the core glass in constituent phases, when the annealing temperature $T_G$ is calculated according to formula (35) from the composition of the core glass in constituent phases, when $\Delta$CTE is calculated as the difference between the $CTE_K$ calculated according to formula (14) and the $CTE_O$ calculated according to formula (14), and when $T_{ambient}=25°$ C. is assumed.

Coefficient of Thermal Expansion Below the Glass Transition Range

From literature is known that the coefficient of thermal expansion, e.g. for metals, is inversely proportional to the binding energy (or to the "depth of the interatomic potential wells"), see e.g. H. Föll, script for the lecture "Einführung in die Materialwissenschaft I", Christian Albrechts-Universitat Kiel, p. 79-83.

In a simple picture of oxidic glasses the cations are placed in one potential well each formed by the surrounding oxygen atoms, and as its depth the sum of the binding strengths of the different single bonds to the surrounding oxygen atoms is postulated, thus the whole interaction energy is concentrated in potential wells with the cations in the center and the oxygen atoms in the periphery. So, the reverse case has not to be considered; it would also be more difficult to analyze it, because an oxygen atom can be located between several different cations, which conversely cannot be the case in purely oxidic glasses. These values are tabulated, e.g., in DE 10 2014 119 594 A1:

TABLE 3

| Cation | Depth of potential well/(kJ/mol) |
|---|---|
| Si | 1864 |
| B | 1572.5 |
| Al | 1537 |
| Mg | 999 |
| Ca | 1063 |
| Na | 440.5 |
| K | 395 |

From the composition of a glass based on the above-mentioned constituent phases, the numbers of different cations contained in the respective phases and the above tabulated depths of potential well per cation it is possible to calculate a mean depth of potential well:

$$\overline{E_{pot}} = \frac{\sum_{i=1}^{n} c_i \cdot \sum_{j=1}^{m} z_{i,j} \cdot E_{pot,j}}{\sum_{i=1}^{n} c_i \cdot \sum_{j=1}^{m} z_{i,j}} \qquad (14)$$

Here, m is the number of the cation types being present, $E_{pot,j}$ is the above tabulated depth of potential well for the j-th cation type and $z_{j,i}$ is the number of the cations of the j-th type in the i-th constituent phase. The sums over j are tabulated in the following:

TABLE 4

"z sums" and "z-$E_{pot}$ sums"

| Constituent phase | Formula (normalized with respect to a simple oxide) | $\sum_{j=1}^{m} z_{i,j}$ ("z sum") | $\Sigma_{j=1}^{m} z_{ij} \cdot E_{pot,j}$ /(kJ/mol) ("z-Epot sum") |
|---|---|---|---|
| reedmergnerite | (Na$_2$O•B$_2$O$_3$•6SiO$_2$)/8 | 1.25 | 1901.25 |
| potassium reedmergnerite | (K$_2$O•B$_2$O$_3$•6SiO$_2$)/8 | 1.25 | 1889.875 |
| albite | (Na$_2$O•Al$_2$O$_3$•6SiO$_2$)/8 | 1.25 | 1881 |
| cordierite | (2MgO•2Al$_2$O$_3$•5SiO$_2$)/9 | 1.222 | 1940.666667 |
| anorthite | (CaO•Al$_2$O$_3$•2SiO$_2$)/4 | 1.25 | 1966.25 |
| boron oxide | B$_2$O$_3$ | 2 | 3145 |
| silicon dioxide | SiO$_2$ | 1 | 1864.00 |

This mean binding strength is, such as e.g. also in the case of metals, see H. Föll, loc. cit., inversely proportional to the coefficient of thermal expansion. An evaluation of a series of siliceous glasses of different type (soda lime glasses, borosilicate glasses, aluminosilicate glasses) results in the following formula:

$$CTE_{glass} = \left( \frac{50116.33042 \left( \frac{kJ}{mol} \right)}{E_{pot}} - 26.1724514 \right) \text{ppm/K} \quad (15)$$

With that it is possible to predict the $CTE_{glass}$ with an error of 0.3 ppm/K on average.

Since the reachability of the desired CTE difference between core and surface depends on the CTE of the core, in this respect certain values may be desired. The $CTE_{glass}$ calculated according to formula (14) may be at least 3.0 ppm/K, such as at least 3.5 ppm/K, at least 4.0 ppm/K, at least 4.5 ppm/K, at least 4.6 ppm/K, at least 4.7 ppm/K, at least 4.8 ppm/K, or at least 4.9 ppm/K. The $CTE_{glass}$ calculated according to formula (14) may be at most 7.0 ppm/K, such as at most 6.5 ppm/K, at most 6.0 ppm/K, at most 5.5 ppm/K, at most 5.4 ppm/K, at most 5.3 ppm/K, at most 5.2 ppm/K, or at most 5.1 ppm/K. But the CTE should not deviate strongly from a CTE of ca. 5 ppm/K, such as in the case of pharmaceutical glasses, because for them a CTE of ca. 5 ppm/K is common. Therefore, in some embodiments, the $CTE_{glass}$ calculated according to formula (14) is in a range of 3.0 to 7.0 ppm/K, such as of 3.5 to 6.5 ppm/K, of 4.0 to 6.0 ppm/K, of 4.5 to 5.5 ppm/K, of 4.6 to 5.4 ppm/K, of 4.7 to 5.3 ppm/K, of 4.8 to 5.2 ppm/K, or of 4.9 to 5.1 ppm/K. Here, the $CTE_K$ of the core glass is meant.

Thus, in some embodiments, the core glass has a $CTE_K$ calculated according to formula (14) in a range of 3.0 to 7.0 ppm/K, such as of 3.5 to 6.5 ppm/K, of 4.0 to 6.0 ppm/K, of 4.5 to 5.5 ppm/K, of 4.6 to 5.4 ppm/K, of 4.7 to 5.3 ppm/K, of 4.8 to 5.2 ppm/K, or of 4.9 to 5.1 ppm/K. The $CTE_K$ of the core glass calculated according to formula (14) may be at least 3.0 ppm/K, such as at least 3.5 ppm/K, at least 4.0 ppm/K, at least 4.5 ppm/K, at least 4.6 ppm/K, at least 4.7 ppm/K, at least 4.8 ppm/K, or at least 4.9 ppm/K. The $CTE_K$ calculated according to formula (14) may be at most 7.0 ppm/K, such as at most 6.5 ppm/K, at most 6.0 ppm/K, at most 5.5 ppm/K, at most 5.4 ppm/K, at most 5.3 ppm/K, at most 5.2 ppm/K, or at most 5.1 ppm/K.

In some embodiments, the surface glass has a $CTE_O$ calculated according to formula (14) which in comparison to the $CTE_K$ of the core glass calculated according to formula (14) is lower by at least 0.6 ppm/K, such as at least 0.8 ppm/K, at least 1 ppm/K, or at least 1.2 ppm/K. $\Delta CTE = CTE_K - CTE_O$ may be in a range of 0.6 ppm/K to 2.4 ppm/K, such as for example 0.8 ppm/K to 2.2 ppm/K, 1.0 ppm/K to 2.0 ppm/K or 1.2 ppm/K to 1.8 ppm/K. $\Delta CTE = CTE_K \ CTE_O$ may be at most 2.4 ppm/K, such as for example at most 2.2 ppm/K, at most 2.0 ppm/K or at most 1.8 ppm/K.

Density, Molar Volume and Packing Density

For the calculation of the Young's modulus E, it is necessary to know the density, the molar volume and the packing density.

Remarkably, it is possible to calculate the density ρ in a very simple manner via the lever principle from the molar masses $M_i$ and densities $\rho_i$ of the constituent phases:

$$\rho = \frac{\Sigma_{i=1}^{n} c_i \cdot M_i}{\Sigma_{i=1}^{n} c_i \cdot \frac{M_i}{\rho_i}} \quad (16)$$

Here, the numerator of (15) is the molar mass, the denominator is the molar volume $V_{mol}$ of the glass. With that it is possible to predict the density of the glass systems addressed here with an accuracy of 1% on average.

The density values can be found in O. V. Mazurin, M. V. Streltsina, T. P. Shvaiko-Shvaikovskaya, Handbook of Glass Data A-C, Elsevier, Amsterdam, 1983-1987.

In some embodiments, with regard to the transport weight, the density is lower than the density of normal soda lime glass, thus below 2.5 g/cm$^3$, such as below 2.45 g/cm$^3$, below 2.4 g/cm$^3$, or below 2.35 g/cm$^3$.

The influence of the density onto the Young's modulus E is tendentially reverse, so that values of at least 2.2 g/cm$^3$ may be provided, such as values of at least 2.25 g/cm$^3$ or values of at least 2.3 g/cm$^3$.

From the molar volume we also calculate as an interim parameter for further calculations the packing density χ of the glass. For that, at first, for each constituent phase we calculate the (molar) ion volume. Here, we mean the volume which is occupied in one mol of the constituent phase (exactly: one mol of the constituent phase normalized with respect to a simple oxide), when they are regarded as spherical ions with the so-called "crystal radius" according to Robert Shannon, see Robert D. Shannon, Revised Effective Ionic Radii and Systematic Studies of Interatomic Distances in Halides and Chalcogenides, Acta Cryst. A32 (1976), p. 751-767. These radii are different depending on the coordination number. For the cations the coordination numbers which are required for that are extracted from the mineralogic literature below listed in connection with the discussion of the constituent phases; according to Conradt R., loc. cit., we assume that the coordination numbers of the cations in the glass are the same as in the case of the respective crystal phases. The oxygen atoms pursuant to the valence are assigned to the cations, that is, to one sodium ion a half oxygen ion appertains, etc. Then, for the single oxygen ion it is assumed that it is appropriately coordinated with regard to this assignment, i.e. an oxygen ion which is assigned to a silicon ion has a respective coordination number of two, etc. When for single coordination numbers no explicit values for the radii can be found in the table of Robert D. Shannon, loc. cit., then inter- or extrapolation is conducted.

In the following, the molar ion volumes which result therefrom are tabulated together with the molar masses and the density values.

TABLE 5

Molar masses, densities and molar ion volumes of the normalized constituent phases

| Constituent phase | Formula (normalized with respect to a simple oxide) | $M_i$/g | $\rho_i$/(g/cm$^3$) | Ion volume $V_{ion,i}$/cm$^3$ |
|---|---|---|---|---|
| reedmergnerite | $(Na_2O \cdot B_2O_3 \cdot 6SiO_2)/8$ | 61.513 | 2.445 | 10.18044415 |
| potassium reedmergnerite | $(K_2O \cdot B_2O_3 \cdot 6SiO_2)/8$ | 65.540 | 2.417 | 12.17972854 |
| albite | $(Na_2O \cdot Al_2O_3 \cdot 6SiO_2)/8$ | 65.555 | 2.368 | 10.2644898 |
| cordierite | $(2MgO \cdot 2Al_2O_3 \cdot 5SiO_2)/9$ | 64.994 | 2.635 | 9.754984882 |
| anorthite | $(CaO \cdot Al_2O_3 \cdot 2SiO_2)/4$ | 69.552 | 2.694 | 10.55580119 |
| boron oxide | $B_2O_3$ | 69.619 | 1.82 | 13.4254877 |
| silicon dioxide | $SiO_2$ | 60.084 | 2.203 | 9.100438178 |

Then, the packing density can be calculated as follows:

$$\chi = \frac{\sum_{i=1}^{n} c_i \cdot V_{ion,i}}{\sum_{i=1}^{n} c_i \cdot \frac{M_i}{\rho_i}} \tag{17}$$

Since, tendentially, the Young's modulus E is larger, when the packing density is higher, the following exemplary values in ascending order may be provided: >0.35; >0.355; >0.36; >0.365; >0.37; >0.375; >0.38; >0.385; >0.39; >0.395; >0.4.

Modulus of Elasticity

The starting point for the calculation of the modulus of elasticity is the theory of Makishima and Mackenzie, see "Direct calculation of Young's modulus of glass", "Calculation of bulk modulus, shear modulus and Poisson's ratio of glass", J. Non-Crystall. Sol., 1973 and 1975. According to this theory, the modulus of elasticity can be described as follows:

$$E \propto \chi \cdot \sum_{i=1}^{n} e_{diss.,i} \cdot c_i \tag{18}$$

Here, $e_{diss.,i}$ is the dissociation energy density of the i-th component (dimension e.g. kJ/cm$^3$) and $c_i$ is its molar portion. $\chi$ is the packing density.

For the further calculations, it is rearranged into:

$$E \propto \chi \cdot \frac{1}{V_{mol}} \cdot \sum_{i=1}^{n} E_{diss.,i} \cdot c_i \tag{19}$$

The dissociation energy according to Makishima and Mackenzie is the same such as the above-mentioned binding strength. Above, the last one we have assigned to the cations, so that we, when for us the components relate to simple oxides, can identify the averaged molar dissociation energy with the above-mentioned mean depth of potential well of a cation, multiplied by the number z of the cations per mol:

$$\sum_{i=1}^{n} E_{diss.,i} \cdot c_i = \sum_{i=1}^{n} c_i \cdot z_i \cdot E_{pot,i} = \overline{E_{pot,i}} \cdot \sum_{i=1}^{n} c_i \cdot z_i = \overline{E_{pot}} \cdot z \tag{20}$$

So, we get:

$$E \propto \chi \cdot \frac{\overline{E_{pot}} \cdot z}{V_{mol}} \tag{21}$$

With the above-mentioned theory very good results are obtained for glasses which do not comprise boroxol rings; the ad-hoc enhancement for borates made by Makishima and Mackenzie is not a satisfying one.

A new theory of Plucinski and Zwanziger ("Topological constraints and the Makishima-Mackenzie model", J. Non-Crystall. Sol., 2015) supplements the term attribute with a topologic prefactor, but in the published form, it is only suitable for absolutely covalently bonded glasses (chalcogenides).

Therefore, here, a modified topologic prefactor is defined.

The essence of topologic considerations is, such as for example explained in DE 10 2014 119 594 A1 in detail, to count the constraints being imposed onto the atoms by the bond to the neighboring atoms. These constraints relate, on the one hand, to the interatomic distance ("distance conditions") and, on the other hand, to the bond angles ("angle conditions"). When an atom has r neighbors (r=coordination number), then from the r distance conditions to these neighbors r/2 distance conditions which have to be assigned to this atom result, when the distance conditions are equally distributed under both binding partners. From the bond angles between these neighbors, when the considered atom is assumed as the vertex of the respective angle, further 2r-3 angle conditions which have to be assigned to this atom follow.

In DE 10 2014 119 594 A1 a method is described which in the calculation of the distance and angle conditions makes a weighting of all conditions with the single binding strength and once again an additional weighting of the angle conditions (only those which arise from the angles oxygen-cation-oxygen; the conditions which belong to the angles cation-oxygen-cation are neglected) with the covalence degree of the respective bond. Here, the weighting factors are normalized, each by dividing by the single binding strength or the covalence degree of the silicon-oxygen bond so that for quartz glass a number of (rounded) 1.333333333 (i.e. 4/3) distance conditions and (rounded) 1.666666667 (i.e. 5/3) angle conditions per atom results. This is consistent, such as explained in DE 10 2014 119 594 A1, with the direct analysis of the topology of quartz glass, when all distance and angle conditions are counted singly and the angle conditions of the angles silicon-oxygen-silicon are neglected.

Thus, quartz glass is characterized by a number of "3" constraints per atom, which exactly corresponds to the number of the degrees of freedom per atom. Thus, quartz glass should not comprise (or in reality: a very low) a number of configuration degrees of freedom per atom, which corresponds to the low $c_p$ saltus of quartz glass during glass transition measured through differential calorimetry, see R. Brüning, "On the glass transition in vitreous silica by differential thermal analysis measurements", Journal of Non-Crystalline Solids, 330 (2003) 13-22.

For other oxidic glasses generally lower values for the numbers of the distance and angle conditions per atom than (rounded) 1.333333333 (4/3) or 1.666666667 (5/3) result. In the case of the angle conditions it is also possible to distinguish between angle conditions of angles which all are in one plane (trigonal coordination) and angle conditions of angles where this is not the case (tetrahedral or higher coordination). Here, the last one are referred to as 3D angle conditions.

Correspondingly, "4/3 minus distance conditions number" is referred to as number of distance degrees of freedom, "5/3 minus angle conditions number" is referred to as number of angle degrees of freedom and "5/3 minus 3D angle conditions number" is referred to as number of 3D angle degrees of freedom, each per atom (short: "p.a.").

Furthermore, the following can be considered. The model approach of Makishima-Mackenzie summarizes and averages isotropic interactions. But in the region of the boroxol rings the interaction is not an isotropic one, because in the plane of the boroxol rings a "powerless" sliding is possible.

In order to take this into account it is regarded that the modulus of elasticity E consists of a shear and a compression/dilatation portion. This is expressed by the following equations, see e.g. H. Föll, script for the lecture "Einführung in die Materialwissenschaft I", Christian Albrechts-Universitat Kiel, p. 79-83:

$$\frac{1}{E} = \frac{1}{3G} + \frac{1}{9K} \tag{22a}$$

$$G = \frac{E}{2(1+\mu)} \tag{22b}$$

$$K = \frac{E}{3(1-2\mu)} \tag{22c}$$

$$K = G\frac{2(1+\mu)}{3(1-2\mu)} \tag{22d}$$

Here, G is the shear modulus, K is the compression modulus and $\mu$ is the Poisson ratio. Alternatively, according to (21), E can be calculated from one of the parameter pairs G and K, G and $\mu$ as well as K and $\mu$.

Now, the theory of Makashima and Mackenzie is modified such that the above-mentioned proportionality between modulus and dissociation energy density is not formulated for the modulus of elasticity E, but for the shear modulus G:

$$G \propto \frac{\overline{E_{pot}} \cdot z}{V_{mol}} \tag{23}$$

For the shear modulus, here, no further proportionality to the packing density is formulated; the relationship to the packing density which is also implemented here (as in the case of Makishima and Mackenzie) is introduced below.

The fact that the presence of boroxol rings due to the above-mentioned sliding planes results in a decrease of the shear modulus is taken into account by a prefactor f which is defined as a ratio between numbers. The first number is the angle conditions number p.a. reduced by (⅔) of the difference between the number of 3D angle degrees of freedom p.a. and the number of angle degrees of freedom p.a. The second number is the angle conditions number p.a. When no boroxol rings are present, then this prefactor is one; when boroxol rings are present, then this prefactor is smaller than one.

$$G \propto f \cdot \frac{\overline{E_{pot}} \cdot z}{V_{mol}}, \tag{24}$$

$$f = \frac{\text{angle conditions number } p.a. - \left(\frac{2}{3}\right)(\text{number of 3D angle degrees of freedom } p.a. - \text{number of angle degrees } o)}{\text{angle conditions number } p.a.}$$

The number (⅔) results from the following consideration relating to shear. It is assumed that the boroxol rings are distributed and positioned such that (⅓) of them are in the plane which comprises the shear axis and (⅔) of them are in planes which are perpendicular thereto. Only both which are mentioned last make a contribution to a decrease of the shear modulus. Accordingly, even only (⅔) of those angle degrees of freedom are counted which in addition are yielded, when not all angle conditions, but only the 3D angle conditions are counted.

In contrast to the shear modulus, for the compression modulus no considerable change through the presence of the sliding planes is expected. For reasons of consistency this has a consequence for the Poisson ratio $\mu$. For that (21d) is regarded. When G changes by the implementation of sliding planes and when at the same time K should not change due to otherwise unchanged conditions, then this can and has to be compensated by a modification $\Delta\mu_f$ of $\mu$. For quantifying this modification in first approximation, K in first order is developed with respect to f and $\mu$; then it is also postulated that $\Delta K=0$:

$$\Delta K = \frac{2(1+\mu)}{3(1-2\mu)} \frac{\partial G}{\partial f} \Delta f + G\left(\partial \frac{2(1+\mu)}{3(1-2\mu)} / \partial \mu\right)\Delta\mu = \tag{25}$$

$$\frac{2(1+\mu)}{3(1-2\mu)} \frac{G}{f} \Delta f + G\left(\frac{2}{(1-2\mu)^2}\right)\Delta\mu_f \stackrel{!}{=} 0$$

From that follows:

$$\Delta\mu_f = -\left[\frac{(1+\mu)(1-2\mu)}{3}\frac{1}{f}\right]\Delta f \quad (26)$$

Since the glasses provided according to the present invention are siliceous glasses, as reference point for the development quartz glass is chosen. For quartz glass the following is true: $\mu=0.17$ and $f=1$, therefore these values are inserted into the squared-bracket term. So, this term amounts to the value 0.2574. For obtaining $\Delta\mu_f$ for another siliceous glass, $-0.2574$ is multiplied by $\Delta f=f-1$; wherein here f is the value which results from (23) for this other glass.

When changing from quartz glass to another siliceous glass, with respect to $\mu$ also another fact has to be considered. Other siliceous glasses have similar, but different packing densities, and there is a positive correlation between $\mu$ and the packing density, see Greaves, G., Greer, A., Lakes, R., Rouxel, T., Poisson's ratio and modern materials, Nature Mater 10, 823-837 (2011). This is taken into account by a second $\Delta\mu$ term which is called $\Delta\mu\chi$. For the glasses provided according to the present invention this one can be assumed to be linear, so that the following is true:

$$\frac{\Delta\mu_\chi}{\mu} = \frac{\Delta\chi}{\chi} \quad (27)$$

As reference point again quartz glass is used, for which the following is true: $\chi=0.33367062$. Then, $\Delta\chi$ is determined from the value $\chi$ which is calculated according to (16) and 0.33367062 according to $\Delta\chi=\chi-0.33367062$. As the denominator on the left side $\mu=0.17$ is used and as the denominator on the right side $\chi=0.33367062$ is used. So, we calculate $\mu$ for a glass provided according to the present invention as follows:

$$\mu=0.17+\Delta\mu_f+\Delta\mu_\chi \quad (28)$$

With this and with (21b), for E the following formula can be formulated:

$$E = a \cdot 2 \cdot (1+\mu) \cdot f \cdot \frac{\overline{E_{pot}} \cdot z}{V_{mol}} + b \quad (29)$$

With regard to this relationship, it is reasonable to select a value for $\mu$ which is higher than a certain minimum value. In some embodiments, the following is true: $\mu>0.18$, such as $\mu>0.185$, $\mu>0.19$, or $\mu>0.195$.

"a" and "b" are adjustable parameters. The evaluation of a series of different siliceous glasses of different type (soda lime glasses, borosilicate glasses, aluminosilicate glasses) results in the following formula:

$$E = \left(0.683888667\left(2 \cdot (1+\mu) \cdot f \cdot \frac{\overline{E_{pot}} \cdot z}{V_{mol}}\right) - 39.4242404\right) GPa \quad (30)$$

Here, $\overline{E_{pot}}$ has to be inserted in kJ/mol, z is dimensionless (mol of cations per mol of glass) and $V_{mol}$ has to be inserted in cm$^3$. $\overline{E_{pot}}$ has to be determined respectively according to formula (13) and table (4). $V_{mol}$ is the denominator in equation (117). f is determined from the angle conditions according to formula (23) and table (6). $\Delta\mu$ results according to equation (27) from $\Delta\mu_f$ and $\Delta\mu\chi$. $\Delta\mu_f$ results according to equation (25) from f $\Delta\mu\chi$ is determined with equation (26); necessary input is the packing density $\chi$ which for their part is determined according to equation (16). So, a mean error of 2.5 GPa for the calculation of E is obtained.

Since the glasses provided according to the present invention comprise a combination of the above-mentioned constituent phases, for the calculation of the number of the distance, angle and 3D angle conditions per atom it is advantageous, at first to specify them numerically for each constituent phase.

The following numerical values at first have been calculated according to the method given in DE 10 2014 119 594 A1, wherein here the number of the angle conditions for all cations has been calculated, namely as in DE 10 2014 119 594 A1 (but there only for boron and aluminum); in addition, the degree of ionization of a cation-oxygen compound has not been calculated according to formula (8) of DE 10 2014 119 594 A1, but according to formula (3) of Alberto Garcia, Marvon Cohen, First Principles Ionicity Scales, Phys. Rev. B, 1993. The coordination numbers which are required for that can be found in the mineralogic literature being listed below in the discussion of the constituent phases; and according to Conradt R., loc. cit., we assume that the coordination numbers of the cations in the glass are the same as those of the corresponding crystal phases.

The following is true:

TABLE 6

| | Number of the distance conditions, etc. | | | |
|---|---|---|---|---|
| Constituent phase + formula (normalized with respect to a simple oxide) | Atoms/ assembly unit | Distance conditions/ atom $b_{A,i}$ | Angle conditions/ atom $b_{W,i}$ | 3D angle conditions/ atom $b_{3DW,i}$ |
| reedmergnerite (Na$_2$O · B$_2$O$_3$ · 6SiO$_2$)/8 | 3.25 | 1.255364807 | 1.431196438 | 1.431196438 |
| potassium reedmergnerite (K$_2$O · B$_2$O$_3$ · 6SiO$_2$)/8 | 3.25 | 1.247854077 | 1.427878942 | 1.427878942 |
| albite (Na$_2$O · Al$_2$O$_3$ · 6SiO$_2$)/8 | 3.25 | 2.597273435 | 1.347768648 | 1.347768648 |
| cordierite (2MgO · 2Al$_2$O$_3$ · 5SiO$_2$)/9 | 3.2222 | 1.292437472 | 1.239141194 | 1.239141194 |
| anorthite (CaO · Al$_2$O$_3$ · 2SiO$_2$)/4 | 3.25 | 1.298283262 | 1.174000738 | 1.174000738 |
| boron oxide B$_2$O$_3$ | 5 | 1.349785408 | 1.496075913 | 0 |
| silicon dioxide SiO$_2$ | 3 | 1.333333333 | 1.666666667 | 1.666666667 |

Thus, the calculation rule for the determination of the angle conditions $b_W$ per atom in the final glass is as follows:

$$b_W = \frac{\sum_{i=1}^{n} c_i \cdot y_i \cdot b_{W,i}}{\sum_{i=1}^{n} c_i \cdot y_i} \quad (31)$$

wherein $c_i$ is the molar portion of the i-th constituent phase in the considered glass composition, $y_i$ is the number of the atoms per assembly unit in the i-th constituent phase and $b_{W,i}$ is the number of the angle conditions per atom in the i-th constituent phase. "n" is the number of the constituent phases.

Analogously, the calculation rule for the determination of the 3D angle conditions $b_{3D-W}$ per atom in the final glass is as follows:

$$b_{3D-W} = \frac{\sum_{i=1}^{n} c_i \cdot y_i \cdot b_{3D-W,i}}{\sum_{i=1}^{n} c_i \cdot y_i} \quad (32)$$

wherein $b_{3D-W,i}$ is the number of the 3D angle conditions per atom in the i-th constituent phase.

Analogously, the calculation rule for the determination of the distance conditions $b_A$ per atom in the final glass is as follows:

$$b_A = \frac{\sum_{i=1}^{n} c_i \cdot y_i \cdot b_{A,i}}{\sum_{i=1}^{n} c_i \cdot y_i} \quad (33)$$

wherein $b_{A,i}$ is the number of the distance conditions per atom in the i-th constituent phase.

Processing Temperature

For the calculation of the annealing temperature $T_G$, at first, the calculation of the processing temperature VA has to be conducted.

The processing temperature VA at which the viscosity is $10^4$ dPa·s can be calculated in a similar manner such as the thermal expansion via the mean binding strength. From literature is known that the melting point, e.g. for metals, is inversely proportional to the binding energy (or to the "depth of the interatomic potential wells"), see e.g. H. Föll, script for the lecture "Einführung in die Materialwissenschaft I", Christian Albrechts-Universität Kiel, p. 79-83; here, the melting point is identified cum grano salis with the processing temperature.

Thus, it can be formulated VA=a·$\overline{E_{pot}}$+b. The evaluation of a series of different siliceous glasses of different type (soda lime glasses, borosilicate glasses, aluminosilicate glasses) results in the following formula:

$$VA = 0.989573825 \cdot \overline{E_{pot}} \cdot \frac{°C.}{kJ/mol} - 387.9923613° C. \quad (33)$$

So, a mean error of 28 K is obtained for the calculation of VA.

With regard to the desired flat course of the viscosity curve the VA calculated according to formula (33) may be at least 1200° C., such as at least 1210° C., at least 1220° C., at least 1230° C., or at least 1240° C. With regard to the process suitability, on the other hand, the VA calculated according to formula (33) may be at most 1300° C., such as for example at most 1290° C., at most 1280° C., at most 1270° C. or at most 1260° C. In some embodiments, the processing temperature VA calculated according to formula (33) is in a range of 1200° C. to 1300° C., such as of 1210° C. to 1290° C., of 1220° C. to 1280° C., of 1230° C. to 1270° C., or of 1240° C. to 1260° C.

Difference Between Processing Temperature and Annealing Temperature, Annealing Temperature With regard to the above-mentioned importance of the "shortness" or "length" of a glass, thus a steep or flat course of the viscosity curve above the annealing temperature, the difference between the processing temperature VA and the annealing temperature $T_G$ at which the viscosity is $10^{13}$ dPa·s is of particular importance.

Surprisingly, it has been found that there is a relationship between this difference on the one hand and the number of the angle degrees of freedom on the other hand. This allows a direct statement with respect to VA–$T_G$ as well as an indirect determination of the annealing temperature via the relationship $T_G$=VA–(VA–$T_G$).

Starting point is the following consideration. The distance between $T_G$ and VA is a question of the temperature profile of the viscosity in the range of the subcooled melt. Via small intervals of the temperature this can be described with the thermal activation model of Arrhenius. For a description of the whole temperature range more complex models are required. Mostly used is the model of Adam and Gibbs, see G. Adam, J. H. Gibbs, On the Temperature Dependence of Cooperative Relaxation Properties in Glass-Forming Liquids, J. Chem. Phys., 43 (1965) p. 139-145. It combines the thermal activation model approach of Arrhenius for the movement of a single atom with a consideration, how many atoms have to interact so that a partial movement of the viscous flow is possible. The result is a relationship between the viscosity and the configuration entropy.

This relationship allows an understanding, why there are "short" and "long" glasses and how this behavior depends on the composition. The rule of thumb is: "the higher the number of the configuration degrees of freedom, the 'shorter' the glass". The number of the configuration degrees of freedom in turn, as already explained above, depends on the composition. In glasses in which predominantly covalent bonds prevail, such as those between silicon and oxygen, this number is small. In glasses with many ionic bonds such as between sodium and oxygen it is high.

A quantitative measure of the "shortness" of a glass which is excellently suitable for profound physicochemical considerations is the concept of "fragility" originating from Austen Angell, see Charles Austen Angell, Thermodynamic aspects of the glass transition in liquids and plastic crystals, Pure & Appl. Chem., 63, no. 10 (1991), p. 1387-1392.

This background has suggested to test a correlation between the parameter VA–$T_G$ and the number of the configuration degrees of freedom. Since real reconfigurations always involve a utilization of the angle degrees of freedom, here the last one are addressed. Here, the number of the angle degrees of freedom per atom $f_W$ is calculated from the number of the angle-related constraints as follows, compare (30).

$$f_W = 5/3 - b_W = 5/3 - \frac{\sum_{i=1}^{n} c_i \cdot y_i \cdot b_{W,i}}{\sum_{i=1}^{n} c_i \cdot y_i} \quad (34)$$

The evaluation of a series of different siliceous glasses of different type (soda lime glasses, borosilicate glasses, aluminosilicate glasses) results in the following formula:

$$\frac{1}{VA-T_G} = (0.002665819 \cdot f_W + 0.001119212) \cdot \frac{1}{K} \quad (34)$$

$T_G$ can be calculated from VA and VA–$T_G$. A mean error of 22 K for $T_G$ is obtained.

Selection of Suitable Constituent Phases

Reedmergnerite

The production of a product provided according to the present invention should be realized by a targeted utilization of the different tendency of the different glass constituents to evaporate from exposed hot glass surfaces. This tendency is particularly distinct in the case of boron and alkalis so that from exposed surfaces of hot borosilicate glasses (here "hot" means: in the neighborhood of the processing temperature, thus the temperature at which the viscosity of the glass is $10^4$ dPa·s) typically alkali borate evaporates, see Johannes Alphonsius Christianus van Limpt, Modeling of evaporation processes in glass melting furnaces, thesis, Technische Universiteit Eindhoven, 2007, ISBN: 978-90-386-1147-1.

In this respect reedmergnerite is an essential constituent of the glass provided according to the present invention. At high temperatures, thus typically at VA, reedmergnerite dissociates partly into sodium borate which evaporates and into $SiO_2$ which remains in the melt. At low temperatures, thus typically $T_G$, reedmergnerite is present in a non-dissociated state and it is composed of $SiO_4$ and $BO_4$ tetrahedrons, thus a tectosilicate. The sodium ions which fill the skeleton have a coordination number of 5, see Appleman, D. E., Clark, J. R.: Crystal structure of reedmergnerite, a boron albite, and its relation to feldspar crystal chemistry, Am. J. Sci. 50, 1827-1850 (1965). For the also desired high Young's modulus, this is an advantage.

With regard to the high value of the $CTE_{glass}$ of reedmergnerite glass in comparison to the maximum value of $CTE_{glass}$ which is desired here, the portion of reedmergnerite is at most 80% by mol. One mol of reedmergnerite means one mol of $(Na_2O \cdot B_2O_3 \cdot 6SiO_2)/8$.

The portion of reedmergnerite in the core glass provided according to the present invention is 10 to 80% by mol, such as 12 to 75% by mol, 15 to 70% by mol, 18 to 65% by mol, 20 to 63% by mol, 21 to 60% by mol, 22 to 58% by mol, 24 to 56% by mol, 26 to 54% by mol, 28 to 52% by mol, 30 to 50% by mol, 33 to 49% by mol, 36 to 48% by mol, 39 to 47% by mol, or 42 to 46% by mol. The portion of reedmergnerite in the core glass provided according to the present invention is at least 10% by mol, such as at least 12% by mol, at least 15% by mol, at least 18% by mol, at least 20% by mol, at least 21% by mol, at least 22% by mol, at least 24% by mol, at least 26% by mol, at least 28% by mol, at least 30% by mol, at least 33% by mol, at least 36% by mol, at least 39% by mol, or at least 42% by mol. The portion of reedmergnerite in the core glass provided according to the present invention is at most 80% by mol, such as at most 75% by mol, at most 70% by mol, at most 65% by mol, at most 63% by mol, at most 60% by mol, at most 58% by mol, at most 56% by mol, at most 54% by mol, at most 52% by mol, at most 50% by mol, at most 49% by mol, at most 48% by mol, at most 47% by mol, or at most 46% by mol.

The portion of reedmergnerite in the surface glass provided according to the present invention is 2 to 60% by mol, such as 2.5 to 55% by mol, 3 to 50% by mol, 4 to 45% by mol, 5 to 40% by mol, 6 to 38% by mol, 7 to 36% by mol, 8 to 34% by mol, 9 to 32% by mol, 10 to 30% by mol, 12 to 29% by mol, 14 to 28% by mol, 16 to 27% by mol, 18 to 26% by mol, or 20 to 25% by mol. The portion of reedmergnerite in the surface glass provided according to the present invention is at least 2 to 60% by mol, such as at least 2.5% by mol, at least 3% by mol, at least 4% by mol, at least 5% by mol, at least 6% by mol, at least 7% by mol, at least 8% by mol, at least 9% by mol, at least 10% by mol, at least 12% by mol, at least 14% by mol, at least 16% by mol, at least 18% by mol, or at least 20% by mol. The portion of reedmergnerite in the surface glass provided according to the present invention is at most 60% by mol, such as at most 55% by mol, at most 50% by mol, at most 45% by mol, at most 40% by mol, at most 38% by mol, at most 36% by mol, at most 34% by mol, at most 32% by mol, at most 30% by mol, at most 29% by mol, at most 28% by mol, at most 27% by mol, at most 26% by mol, or at most 25% by mol.

In some embodiments, the ratio of the portion of reedmergnerite in the core glass to the portion of reedmergnerite in the surface glass is in a range of 1.4:1 to 7.0:1, such as of 1.5:1 to 6.0:1, of 1.6:1 to 5.0:1, or of 1.7:1 to 4.5:1. In some embodiments, the ratio of the portion of reedmergnerite in the core glass to the portion of reedmergnerite in the surface glass is at least 1.4:1, such as at least 1.5:1, at least 1.6:1, or at least 1.7:1. In some embodiments, the ratio of the portion of reedmergnerite in the core glass to the portion of reedmergnerite in the surface glass is at most 7.0:1, such as at most 6.0:1, at most 5.0:1, or at most 4.5:1. Certain differences of the portion of reedmergnerite between core glass and surface glass are advantageous, because in a particular extent they contribute to the desired CTE differences between core glass and surface glass. However, it may be advantageous to limit the differences of the reedmergnerite portion, for avoiding very high CTE differences.

$SiO_2$

With regard to the low desired maximum value of $CTE_{glass}$, for logical reasons, the reedmergnerite is combined with pure $SiO_2$ as further constituent phase. In addition, it is known that a high portion of $SiO_2$ is reasonable for a high chemical resistance of the glass. Also due to this reason a high portion of $SiO_2$ as constituent phase is desired.

However, this portion is limited due to several reasons. At first, $SiO_2$ does not show the above-described effect of reedmergnerite which is necessary for generating a CTE gradient. In addition, $SiO_2$ glass is composed of not filled $SiO_4$ tetrahedrons which is a disadvantage for the desired high Young's modulus. Because, a too high portion of $SiO_2$ as constituent phase results in a processing temperature of the glass which is too high from a processing technology point of view.

The portion of silicon dioxide in the core glass provided according to the present invention is 5 to 60% by mol, such as 10 to 55% by mol, 12 to 50% by mol, 14 to 45% by mol, 15 to 40% by mol, 16 to 37% by mol, 18 to 36% by mol, 20 to 35% by mol, 22 to 34% by mol, 25 to 33% by mol, or 27 to 32% by mol. The portion of silicon dioxide in the core glass provided according to the present invention is at least 5% by mol, such as at least 10% by mol, at least 12% by mol, at least 14% by mol, at least 15% by mol, at least 16% by mol, at least 18% by mol, at least 20% by mol, at least 22% by mol, at least 25% by mol, or at least 27% by mol. The portion of silicon dioxide in the core glass provided according to the present invention is at most 60% by mol, such as at most 55% by mol, at most 50% by mol, at most 45% by mol, at most 40% by mol, at most 37% by mol, at most 36% by mol, at most 35% by mol, at most 34% by mol, at most 33% by mol, or at most 32% by mol.

The portion of silicon dioxide in the surface glass provided according to the present invention is 6 to 80% by mol, such as 12 to 75% by mol, 15 to 70% by mol, 20 to 65% by mol, 25 to 60% by mol, 30 to 58% by mol, 35 to 56% by mol, 40 to 55% by mol, 42 to 54% by mol, 44 to 53% by mol, or 45 to 52% by mol. The portion of silicon dioxide in the surface glass provided according to the present invention is at least 6% by mol, such as at least 12% by mol, at least 15% by mol, at least 20% by mol, at least 25% by mol, at least 30% by mol, at least 35% by mol, at least 40% by mol, at least 42% by mol, at least 44% by mol, or at least 45% by mol. The portion of silicon dioxide in the surface glass provided according to the present invention is at most 80% by mol, such as at most 75% by mol, at most 70% by mol, at most 65% by mol, at most 60% by mol, at most 58% by mol, at most 56% by mol, at most 55% by mol, at most 54% by mol, at most 53% by mol, or at most 52% by mol.

In some embodiments, the ratio of the portion of silicon dioxide in the surface glass to the portion of silicon dioxide in the core glass is in a range of 1.1:1 to 4.0:1, such as of 1.2:1 to 3.5:1, of 1.3:1 to 3.0:1, of 1.4:1 to 2.5:1, or of 1.5:1 to 2.0:1. In some embodiments, the ratio of the portion of silicon dioxide in the surface glass to the portion of silicon dioxide in the core glass is at least 1.1:1:1, such as at least 1.2:1, at least 1.3:1, at least 1.4:1, or at least 1.5:1. In some embodiments, the ratio of the portion of silicon dioxide in the surface glass to the portion of silicon dioxide in the core glass is at most 4.0:1, such as at most 3.5:1, at most 3.0:1, at most 2.5:1, or at most 2.0:1.

Potassium Reedmergnerite

For increasing the devitrification stability, it is possible also to add the potassium analog of the reedmergnerite to the glass. In the case of such an addition, the final glass contains as alkali not only sodium, but also potassium, and thus it is more stable against devitrification.

In the following, the respective constituent phase is referred to as "potassium reedmergnerite", because it can be understood as potassium analog of reedmergnerite with danburite structure, see Mineralogical Magazine 57 (1993) 157-164.

One mol of potassium reedmergnerite means one mol of $(K_2O.B_2O_3.6SiO_2)/8$.

The portion of potassium reedmergnerite in the core glass provided according to the present invention is 0 to 30% by mol, such as 0 to 25% by mol, 0 to 20% by mol, or 0 to 15% by mol. When potassium reedmergnerite is contained, then, it may be contained in a portion of 1 to 15% by mol, 1 to 14% by mol, 3 to 12% by mol, 4 to 10% by mol, or 5 to 9% by mol. The portion of potassium reedmergnerite in the core glass provided according to the present invention may, for example, be at least 1% by mol, at least 3% by mol, at least 4% by mol, or at least 5% by mol. The portion of potassium reedmergnerite in the core glass provided according to the present invention is at most 30% by mol, such as at most 25% by mol, at most 20% by mol, at most 15% by mol, such as for example at most 14% by mol, at most 12% by mol, at most 10% by mol, or at most 9% by mol.

The portion of potassium reedmergnerite in the surface glass provided according to the present invention is 0 to 40% by mol, such as 0 to 35% by mol, 0 to 30% by mol, or 0 to 25% by mol. When potassium reedmergnerite is contained, then, it may be contained in the surface glass in a portion of 1 to 25% by mol, 1 to 20% by mol, 3 to 15% by mol, 4 to 10% by mol, or 5 to 9% by mol. The portion of potassium reedmergnerite in the surface glass provided according to the present invention may, for example, be at least 1% by mol, at least 3% by mol, at least 4% by mol, or at least 5% by mol. The portion of potassium reedmergnerite in the surface glass provided according to the present invention is at most 40% by mol, such as at most 35% by mol, at most 30% by mol, at most 25% by mol, such as for example at most 20% by mol, at most 15% by mol, at most 10% by mol, or at most 9% by mol.

In some embodiments, the ratio of the portion of potassium reedmergnerite in the surface glass to the portion of potassium reedmergnerite in the core glass is in a range of 0.5:1 to 2.0:1, such as of 0.6:1 to 1.9:1, of 0.7:1 to 1.8:1, of 0.8:1 to 1.7:1, or of 0.9:1 to 1.6:1. In some embodiments, the ratio of the portion of potassium reedmergnerite in the surface glass to the portion of potassium reedmergnerite in the core glass is at least 0.5:1, such as at least 0.6:1, at least 0.7:1, at least 0.8:1, or at least 0.9:1. In some embodiments, the ratio of the portion of potassium reedmergnerite in the surface glass to the portion of potassium reedmergnerite in the core glass is at most 2.0:1, such as at most 1.9:1, at most 1.8:1, at most 1.7:1, or at most 1.6:1. In some embodiments, the portion of potassium reedmergnerite in the surface glass is higher than the portion of potassium reedmergnerite in the core glass. In some embodiments, the portion of potassium reedmergnerite in the surface glass is lower than the portion of potassium reedmergnerite in the core glass. The portion of potassium reedmergnerite in the surface glass can nearly be the same such as the portion in the core glass. For example, the portion in the surface glass can correspond to the portion in the core glass ±at most 10% or ±at most 5%.

Similar such as in the case of reedmergnerite, also potassium reedmergnerite contributes to CTE differences between core glass and surface glass, when the portions of potassium reedmergnerite in the surface glass are different from the portions of potassium reedmergnerite in the core glass. Certain differences of the portion of reedmergnerite between core glass and surface glass may be advantageous, because they contribute to the desired CTE differences between core glass and surface glass. A limitation of the differences may help to avoid very high CTE differences.

$B_2O_3$

Diboron trioxide as constituent phase also evaporates, so that the presence of $B_2O_3$ enhances the above-described effect. The extent of the evaporation can be controlled by the relative air humidity; wherein in the case of the presence of $H_2O$ $B_2O_3$ evaporates in the form of dioxoboric acid $HBO_2$. But a too high portion of $B_2O_3$ decreases the Young's modulus.

The portion of diboron trioxide in the core glass provided according to the present invention is 0 to 20% by mol, such as 0 to 15% by mol, 0 to 10% by mol, 0.5 to 8% by mol, 0.8 to 7% by mol, 1 to 6% by mol, 1.5 to 5.5% by mol, 2 to 5% by mol, 2.5 to 4.5% by mol, or 3 to 4% by mol. The portion of diboron trioxide in the core glass provided according to the present invention may, for example, be at least 0.5% by mol, at least 0.8% by mol, at least 1% by mol, at least 1.5% by mol, at least 2% by mol, at least 2.5% by mol, or at least 3% by mol. The portion of diboron trioxide in the core glass provided according to the present invention is at most 20% by mol, such as at most 15% by mol, at most 10% by mol, at most 8% by mol, at most 7% by mol, at most 6% by mol, at most 5.5% by mol, at most 5% by mol, at most 4.5% by mol, or at most 4% by mol.

The portion of diboron trioxide in the surface glass provided according to the present invention is 0 to 15% by mol, such as 0 to 12.5% by mol, 0 to 10% by mol, 0.2 to 8% by mol, 0.5 to 7% by mol, 0.8 to 6% by mol, 1 to 5.5% by mol, 1.5 to 5% by mol, 2 to 4.5% by mol, or 2.5 to 4% by mol. The portion of diboron trioxide in the surface glass provided according to the present invention may, for example, be at least 0.2% by mol, at least 0.5% by mol, at least 0.8% by mol, at least 1% by mol, at least 1.5% by mol, at least 2% by mol, or at least 2.5% by mol. The portion of diboron trioxide in the surface glass provided according to the present invention is at most 15% by mol, such as at most 12.5% by mol, at most 10% by mol, at most 8% by mol, at most 7% by mol, at most 6% by mol, at most 5.5% by mol, at most 5% by mol, at most 4.5% by mol, or at most 4% by mol.

In some embodiments, the ratio of the portion of diboron trioxide in the core glass to the portion of diboron trioxide in the surface glass is in a range of 1.2:1 to 3.5:1, such as of 1.3:1 to 3.0:1, of 1.4:1 to 2.5:1, or of 1.5:1 to 2.4:1. In some embodiments, the ratio of the portion of diboron trioxide in the core glass to the portion of diboron trioxide in the surface glass is at least 1.2:1, such as at least 1.3:1, at least 1.4:1, or at least 1.5:1. In some embodiments, the ratio of the portion of diboron trioxide in the core glass to the portion of diboron trioxide in the surface glass is at most 3.5:1, such as at most 3.0:1, at most 2.5:1, or at most 2.4:1. Differences of the portion of diboron trioxide between surface glass and core glass may contribute to CTE differences between surface glass and core glass.

It has been shown to be advantageous to adjust the parameters of the production method such that the reduction of the portion of reedmergnerite and of diboron trioxide in the surface glass is in a comparable order of magnitude. So, advantageous compressive stresses can be obtained. In some embodiments, the quotient of the ratio of the portion of reedmergnerite in the core glass to the portion of reedmergnerite in the surface glass, on the one hand, and the ratio of the portion of diboron trioxide in the core glass to the portion of diboron trioxide in the surface glass, on the other hand, is in a range of 0.5:1 to 5:1, such as of 0.75:1 to 3:1. Thus, in some embodiments, with regard to the respective portions of reedmergnerite and diboron trioxide in the surface glass and in the core glass the following is true:

$$0.5 \leq \frac{\text{reedmergnerite}_{core}/\text{reedmergnerite}_{surface}}{\text{diboron trioxide}_{core}/\text{diboron trioxide}_{surface}} \leq 5$$

In some embodiments, the quotient of the ratio of the portion of reedmergnerite in the core glass to the portion of reedmergnerite in the surface glass, on the one hand, and the ratio of the portion of diboron trioxide in the core glass to the portion of diboron trioxide in the surface glass, on the other hand, is at least 0.5:1, such as at least 0.75:1. In some embodiments, the quotient of the ratio of the portion of reedmergnerite in the core glass to the portion of reedmergnerite in the surface glass, on the one hand, and the ratio of the portion of diboron trioxide in the core glass to the portion of diboron trioxide in the surface glass, on the other hand, is at most 5:1, such as at most 3:1.

Albite

For suppressing a possible tendency of a pure borosilicate system to segregation, optionally as further phase the aluminum analog of the reedmergnerite can be added, the albite (American Mineralogist, volume 81, pages 1344-1349, 1996), see for the question of segregation J. W. Greig, Immiscibility in silicate melts, Am. J. Sci., 5th ser., vol. 13 (1927), 1-44 and 133-154. According to the present invention, one mol of albite means one mol of $(Na_2O.Al_2O_3.6SiO_2)/8$. In the case of high portions of albite, the meltability may be deteriorated.

The portion of albite in the core glass provided according to the present invention is 0 to 50% by mol, such as 0.5 to 45% by mol, 1 to 40% by mol, 1.5 to 35% by mol, 2 to 33% by mol, 4 to 30% by mol, 5 to 27% by mol, 7 to 25% by mol, 8 to 22% by mol, 10 to 20% by mol, 11 to 18% by mol, or 12 to 16% by mol. The portion of albite in the core glass provided according to the present invention may, for example, be at least 0.5% by mol, at least 1% by mol, at least 1.5% by mol, at least 2% by mol, at least 4% by mol, at least 5% by mol, at least 7% by mol, at least 8% by mol, at least 10% by mol, at least 11% by mol, or at least 12% by mol. The portion of albite in the core glass provided according to the present invention is at most 50% by mol, such as at most 45% by mol, at most 40% by mol, at most 35% by mol, at most 33% by mol, at most 30% by mol, at most 27% by mol, at most 25% by mol, at most 22% by mol, at most 20% by mol, at most 18% by mol, or at most 16% by mol.

The portion of albite in the surface glass provided according to the present invention is 0 to 70% by mol, such as 1 to 65% by mol, 2 to 60% by mol, 2.5 to 55% by mol, 3 to 50% by mol, 4 to 45% by mol, 5 to 40% by mol, 7.5 to 35% by mol, 10 to 30% by mol, 12 to 28% by mol, 15 to 26% by mol, or 16 to 25% by mol. The portion of albite in the surface glass provided according to the present invention may, for example, be at least 1% by mol, at least 2% by mol, at least 2.5% by mol, at least 3% by mol, at least 4% by mol, at least 5% by mol, at least 7.5% by mol, at least 10% by mol, at least 12% by mol, at least 15% by mol, or at least 16% by mol. The portion of albite in the surface glass provided according to the present invention is at most 70% by mol, such as at most 65% by mol, at most 60% by mol, at most 55% by mol, at most 50% by mol, at most 45% by mol, at most 40% by mol, at most 35% by mol, at most 30% by mol, at most 28% by mol, at most 26% by mol, or at most 25% by mol.

In some embodiments, the ratio of the portion of albite in the surface glass to the portion of albite in the core glass is in a range of 1.02:1 to 2.0:1, such as of 1.05:1 to 1.9:1, of 1.08:1 to 1.8:1, of 1.1:1 to 1.7:1, of 1.12:1 to 1.6:1, or 1.15:1 to 1.5:1. In some embodiments, the ratio of the portion of albite in the surface glass to the portion of albite in the core glass is at least 1.02:1, such as at least 1.05:1, at least 1.08:1, at least 1.1:1, at least 1.12:1, or at least 1.15:1. In some embodiments, the ratio of the portion of albite in the surface glass to the portion of albite in the core glass is in a range of at most 2.0:1, such as at most 1.9:1, at most 1.8:1, at most 1.7:1, at most 1.6:1, or at most 1.5:1.

Cordierite, Anorthite

Reedmergnerite and its potassium analog contain alkalis. As already mentioned, alkali containing glasses have a high coefficient of expansion. For adjusting the coefficient of expansion to the desired value, $SiO_2$ and $B_2O_3$ can be admixed, but with respect to the VA and the Young's modulus they can only be used in limited amounts. It is possible to admix further phases, the contribution of which shifts the coefficient of expansion to mid-level values, without the above-mentioned disadvantages of $SiO_2$ and $B_2O_3$. Here, the alkaline earth (alumino)silicates cordierite and anorthite are meant. One mol of cordierite means one mol of $(2MgO.2Al_2O_3.5SiO_2)/9$. One mol of anorthite means one mol of $(CaO.Al_2O_3.2SiO_2)/4$.

The advantage of these two components in the glasses provided according to the present invention is that aluminum has a very low tendency to evaporation and (although in the case of the below-mentioned examples a certain calcium depletion of the surface can be observed) that also the alkaline earths have a lower tendency to evaporation than the alkalis, see van Limpt, loc. cit., so that by the presence of these phases it can be prevented that by the evaporation at the surface pure quartz glass is formed which is not desired due to its extreme properties (very high $T_G$, etc.).

The portion of cordierite in the core glass provided according to the present invention is 0 to 10% by mol, such as 0 to 5% by mol, 0 to 4% by mol, 0 to 3% by mol, or 0 to 2% by mol. When cordierite is contained, then, in some embodiments, it is contained in a portion of 0.1 to 2% by mol, 0.2 to 1.5% by mol, 0.3 to 1.2% by mol, 0.4 to 1% by mol, or 0.5 to 0.9% by mol. The portion of cordierite in the core glass provided according to the present invention may, for example, be at least 0.1% by mol, at least 0.2% by mol, at least 0.3% by mol, at least 0.4% by mol, or at least 0.5% by mol. The portion of cordierite in the core glass provided according to the present invention is at most 10% by mol, such as at most 5% by mol, at most 4% by mol, at most 3% by mol, at most 2% by mol, such as for example at most 1.5% by mol, at most 1.2% by mol, at most 1% by mol, or at most 0.9% by mol.

The portion of cordierite in the surface glass provided according to the present invention is 0 to 10% by mol, such as 0 to 5% by mol, 0 to 4% by mol, 0 to 3% by mol, or 0 to 2% by mol. When cordierite is contained, then, in some embodiments, it is contained in the surface glass in a portion of 0.1 to 2% by mol, 0.2 to 1.5% by mol, 0.3 to 1.2% by mol, 0.4 to 1% by mol, or 0.5 to 0.9% by mol. The portion of cordierite in the surface glass provided according to the present invention may, for example, be at least 0.1% by mol, at least 0.2% by mol, at least 0.3% by mol, at least 0.4% by mol, or at least 0.5% by mol. The portion of cordierite in the surface glass provided according to the present invention is at most 10% by mol, such as at most 5% by mol, at most 4% by mol, at most 3% by mol, at most 2% by mol, such as for example at most 1.5% by mol, at most 1.2% by mol, at most 1% by mol, or at most 0.9% by mol.

In some embodiments, the portion of cordierite in the surface glass is higher than the portion of cordierite in the core glass. In some embodiments, the portion of cordierite in the surface glass is lower than the portion of cordierite in the core glass. The portion of cordierite in the surface glass can nearly be the same such as the portion in the core glass. For example, the portion in the surface glass can correspond to the portion in the core glass ±at most 10% or ±at most 5%.

The portion of anorthite in the core glass provided according to the present invention is 0 to 25% by mol, such as 0 to 20% by mol, 0 to 15% by mol, 0 to 13% by mol, 0.5 to 12% by mol, 1 to 11% by mol, 2 to 10% by mol, 3 to 9% by mol, or 4 to 8% by mol. The portion of anorthite in the core glass provided according to the present invention may, for example, be at least 0.5% by mol, at least 1% by mol, at least 2% by mol, at least 3% by mol, or at least 4% by mol. The portion of anorthite in the core glass provided according to the present invention is at most 25% by mol, such as at most 20% by mol, at most 15% by mol, at most 13% by mol, at most 12% by mol, at most 11% by mol, at most 10% by mol, at most 9% by mol, or at most 8% by mol.

The portion of anorthite in the surface glass provided according to the present invention is 0 to 20% by mol, such as 0 to 15% by mol, 0 to 13% by mol, 0 to 12% by mol, 0.2 to 10% by mol, 0.5 to 9% by mol, 1 to 8% by mol, 2 to 7% by mol, or 3 to 6% by mol. The portion of anorthite in the surface glass provided according to the present invention may, for example, be at least 0.2% by mol, at least 0.5% by mol, at least 1% by mol, at least 2% by mol, or at least 3% by mol. The portion of anorthite in the surface glass provided according to the present invention is at most 20% by mol, such as at most 15% by mol, at most 13% by mol, at most 12% by mol, at most 10% by mol, at most 9% by mol, at most 8% by mol, at most 7% by mol, or at most 6% by mol.

In some embodiments, the ratio of the portion of anorthite in the core glass to the portion of anorthite in the surface glass is in a range of 1:1 to 3.5:1, such as of 1.05:1 to 3.0:1, of 1.1:1 to 2.5:1, or of 1.15:1 to 2.0:1. In some embodiments, the ratio of the portion of anorthite in the core glass to the portion of anorthite in the surface glass is at least 1:1, such as at least 1.05:1, at least 1.1:1, or at least 1.15:1. In some embodiments, the ratio of the portion of anorthite in the core glass to the portion of anorthite in the surface glass is in a range of at most 3.5:1, such as at most 3.0:1, at most 2.5:1, or at most 2.0:1.

Further Components

In addition to the already mentioned components the glass can contain further constituents which here are referred to as "balance." The portion of the balance of the glass provided according to the present invention may be at most 5% by mol, so that the glass properties which are adjusted by careful selection of suitable base glasses are not disturbed. In some embodiments, the portion of the balance in the glass is at most 3% by mol, such as at most 2% by mol or at most 1% by mol or at most 0.5% by mol. The balance may contain oxides which are not contained in the base glasses mentioned here. So, in some embodiments, the balance does not contain $SiO_2$, $Al_2O_3$, $B_2O_3$, MgO, CaO, $Na_2O$ or $K_2O$.

When in this description is mentioned that the glasses are free of a component or a constituent phase or that they do not contain a certain component or constituent phase, then this means that it is only allowed for this component or constituent phase to be present in the glasses as an impurity. This means that it is not added in substantial amounts. According to the present invention, not substantial amounts are amounts of less than 300 ppm (molar), such as less than 100 ppm (molar), less than 50 ppm (molar), or less than 10 ppm (molar). The glasses provided according to the invention may be free of zinc, barium, zirconium, lead, arsenic, antimony, tin, bismuth and/or cadmium.

All formulas for the calculation of the properties are designed such that the value which relates to a glass consisting of 100% of the constituent phases is calculated. Thus, for the calculations of the properties from the phase composition it is not important, whether the balance is present or not. The formulas are designed such that with balance and without balance the same result is obtained. Accordingly, in the case of higher amounts of balances the calculations become more inexact.

Production

The present invention also relates to a method for the production of a glass article according to the present invention with the steps
melting of the glass raw materials, such as of glass raw materials which correspond to a composition such as is given in this description for the bulk glass;
forming of a glass article, such as a glass tube, from the glass melt
cooling of the glass article.

In some embodiments, the method comprises a tube forming by Danner or Vello or vertical drawing in a muffle. The inner temperature of the muffle in the section of the flowing down/spreading glass may be between $T_G$+0.55

(VA−$T_G$) and $T_G$+0.85(VA−$T_G$). The inner temperature of the muffle in the section of the tube pulling off part may be between $T_G$+0.15(VA−$T_G$) and $T_G$+0.45(VA−$T_G$). The annealing temperature $T_G$ is calculated according to formula (35) from the composition of the core glass in constituent phases and the processing temperature VA is calculated according to formula (33) from the composition of the core glass in constituent phases.

The residence time during which the glass is positioned on the shaping tool in the viscosity range of 3000 dPas to $10^8$ dPas may be in a range of 5 to 60 minutes.

In some embodiments, the method comprises the further step
  supplying the glass with a water vapor containing gas during the forming and/or the melting, wherein the atmosphere resulting thereof may comprise more than 2% by volume of $H_2O$.

In the following, exemplary embodiments of the production are described in more detail.

As already mentioned, the production is realized by a targeted utilization of the different tendency of the different glass constituents, such as of boron and alkalis, to evaporate from exposed hot glass surfaces.

The quantitative extent of this depletion is determined by the kind of the process control. In the so-called Danner method for tube drawing, for example, the hot glass, at first, flows from a feeder onto a rotating, so-called pipe which is mounted in an inclined position and may consist of ceramic material or noble metal. The glass distributes on the pipe and flows, according to gravity, to the lower end of the pipe. There, it has already been cooled so far that the viscosity is high enough for pulling off the glass as a tube from the pipe. At the end of the pulling off part the pipe is designed as a blowing nozzle so that air which is approaching through the pipe interior and blown into the tube prevents the same from collapsing.

Obviously, the residence time of the glass in the temperature range in which evaporation takes place depends on the amount of the flowing glass, on the geometry of the Danner pipe and the residual set-up as well as on the temperature course of the glass from the feeder to the end of the Danner pipe. From that and from the relative air humidity, the extent of the evaporation losses results. In particularly via the adjustment of the parameters also the ratio of the reduction of reedmergnerite in the surface glass to the reduction of diboron trioxide in the surface glass can be adjusted. It has been shown to be advantageous with regard to the compressive stress, when the respective differences of the portions between surface glass and core glass are in a comparable order of magnitude.

Also essential for the evaporation is the saturation of the atmosphere with the evaporating substances. Due to the geometry at the inner surface of the tube this saturation is achieved very quickly and at the outer surface it will be achieved not at all due to the tube drawing which is conducted in the furnace in an open manner, so that a relevant change of the composition is only observed at the outer side.

Now, the process parameters are selected such that the desired product behavior results. From the parameters which are decisive for the evaporation at the outer surface during the tube forming by Danner—or Vello or vertical drawing— in a muffle
  1) at first, the surface temperature of the glass towards the open atmosphere is adjusted. The surface temperature is determined by the flowing down/spreading or nozzle temperature, respectively, and along the tube drawing section by the heating power/thermal loss in the muffle. For achieving the desired cooling of the glass flowing down/spreading with a temperature of between VA−100° C. and VA+250° C. (due to the very flat course of the viscosity curve in this temperature range it is a very small viscosity range) in the region of the muffle, the temperatures of the inner side of the muffle have to be below the temperatures of the glass in the respective sections. For that in turn the temperature distribution of the inner side of the muffle is adjusted such that a relatively high inner temperature of the muffle in the region of the flowing down/spreading glass and a relatively low inner temperature of the muffle in the region of the tube pulling off part are adjusted. For achieving the desired evaporation behavior this temperature range is between $T_G$ and VA, and may be such that the relatively high inner temperature of the muffle in the section of the flowing down/spreading glass is between $T_G$+0.55(VA−$T_G$) and $T_G$+0.85(VA−$T_G$) and that the relatively low inner temperature of the muffle in the section of the tube pulling off part is between $T_G$+0.15(VA−$T_G$) and $T_G$+0.45(VA−$T_G$), wherein these temperatures may be between $T_G$+0.65(VA−$T_G$) and $T_G$+0.75(VA−$T_G$) or $T_G$+0.25(VA−$T_G$) and $T_G$+0.35(VA−$T_G$), respectively. Here, $T_G$ and VA are the values of the unchanged bulk material (core material).
  2) further, the residence time on the outer surface of the glass coating on the tool is adjusted during which the glass is positioned on the shaping tool in the viscosity range of 3000 to 100000000 dPas ($10^8$ dPas). It can be influenced by the tube drawing method and the geometry of the shaping tool, such as the area-specific pulling off load [t/m2*h], and for achieving the desired evaporation behavior it is adjusted such that it may be 5-60 min, such as 10-30 min or 10-20 min.
  3) further, the gas exchange of the atmosphere and respectively the saturation of the atmosphere with evaporation products is adjusted.
    They can be influenced by
      a. vaporizing water, boron or alkali borate into the muffle as well as sealing the muffle against gas exchange
      b. temperature regulation (isolation of the muffle, sealing of the muffle)
      c. kind of the muffle heating (fossil direct, fossil indirect, with air, with oxygen, electro),
    and they are adjusted such that the desired effect especially with respect to the evaporation of $B_2O_3$ as constituent phase is achieved, i.e. with respect to the volume composition of the atmosphere in the muffle: 0% $H_2O$, when no particular stimulation of the evaporation of $B_2O_3$ as constituent phase is desired, such as >2% $H_2O$, >4% $H_2O$, >6% $H_2O$, >8% $H_2O$, >10% $H_2O$, >12% $H_2O$, >14% $H_2O$, >16% $H_2O$, >18% $H_2O$, >20% $H_2O$, >40% $H_2O$, or >60% $H_2O$.

So, in the light of the described measures, kind and extent of the evaporation and, therefore, also the ratio of the reduction of reedmergnerite and diboron trioxide in the surface glass can be adjusted such that the desired compressive stresses are obtained.

Also after leaving the forming tool, at the outer surface of the drawing onion evaporation may take place; but this effect is insignificant.

Use

The invention also relates to the use of the glass article as container and/or packaging, such as for pharmaceutical packages, such as for example as container for liquids.

EXAMPLES

The examples given below have been chemically analyzed as bulk material and also at the surface. Here, the surface analysis was conducted by TOF-SIMS; wherein with regard to the target of being able to compress at least cracks of the depth 1-10 nm, as surface value the mean value of the near surface measurements down to a depth of <20 nm each is used. This also takes the unavoidable noise of this method into account. In each case, 5 or 6 single measurements which were approximately equidistant with respect to the depth starting at a depth of ca. 5 nm down to a depth of <20 nm were conducted. With TOF-SIMS the signal strengths for Si, B, Al, Na, K, Mg and Ca were determined.

Starting at a depth of ca. 500 nm, the TOF-SIMS signal strengths were constant, i.e., for a depth of 600 nm or 700 nm for the same component (approximately) the same value was measured. To these signal strengths a concentration in % was assigned, and exactly that one which was obtained from the normal chemical analysis. These values were extrapolated towards the surface. Subsequently, the surface concentrations so determined were normalized such that their sum amounted to 100%.

Example 1

Example 1 is a boro-aluminosilicate glass which has been manufactured as tube with the outer diameter of 10.75 mm and the wall thickness of 0.5 mm and the composition of which at the outer side has been determined by TOF-SIMS.

The values of the compositions in the core have been equated with the results of a chemical analysis so that a normalization of the TOF-SIMS measuring values was achieved. When the TOF-SIMS results are extrapolated into the direction of the surface (the same signal strength means the same mass flow), then the following expressed in constituent phases (rounded) is obtained:

TABLE 3

| Constituent phase | ~in the core/ % by mol (normalized) | ~at the surface/ % by mol (normalized) |
|---|---|---|
| reedmergnerite $(Na_2O \cdot B_2O_3 \cdot 6SiO_2)/8$ | 44 | 25 |
| potassium reedmergnerite $(K_2O \cdot B_2O_3 \cdot 6SiO_2)/8$ | 0 | 0 |
| albite $(Na_2O \cdot Al_2O_3 \cdot 6SiO_2)/8$ | 14 | 19 |
| cordierite $(2MgO \cdot 2Al_2O_3 \cdot 5SiO_2)/9$ | 0 | 0 |
| anorthite $(CaO \cdot Al_2O_3 \cdot 2SiO_2)/4$ | 6 | 4 |
| boron oxide $B_2O_3$ | 4 | 2 |
| silicon dioxide $SiO_2$ | 32 | 50 |
| sum | 100 | 100 |

According to the equations (15, Error! Reference source not found., Error! Reference source not found., Error! Reference source not found., 34), the following property values (rounded) are calculated:

| Property | Core | Surface |
|---|---|---|
| CTE | 4.8 ppm/K | 3.8 ppm/K |
| $E/(1 - \mu)$ | 93.6 GPa | 90.0 GPa |
| $T_G$ | 597° C. | 607° C. |
| VA | 1213° C. | 1266° C. |
| $\sigma_0$ | When in (10) for $E/(1 - \mu)$ and $T_G$ the values of the core material and for ΔCTE the difference between the here obtained values of the core and the surface are used, then for the value of the compressive prestress at the surface the following is obtained: | 53.5 MPa |

Example 2

Example 2 is a boro-aluminosilicate glass which has been manufactured as tube with the outer diameter of 40.00 mm and the wall thickness of 1.5 mm and the composition of which at the outer side has been determined by TOF-SIMS.

The values of the compositions in the core have been equated with the results of a chemical analysis so that a normalization of the TOF-SIMS measuring values was achieved. From that follows, expressed in constituent phases (rounded):

TABLE 4

| Constituent phase | ~in the core/ % by mol (normalized) | ~at the surface/ % by mol (normalized) |
|---|---|---|
| reedmergnerite $(Na_2O \cdot B_2O_3 \cdot 6SiO_2)/8$ | 44 | 23 |
| potassium reedmergnerite $(K_2O \cdot B_2O_3 \cdot 6SiO_2)/8$ | 0 | 0 |
| albite $(Na_2O \cdot Al_2O_3 \cdot 6SiO_2)/8$ | 14 | 20 |
| cordierite $(2MgO \cdot 2Al_2O_3 \cdot 5SiO_2)/9$ | 0 | 0 |
| anorthite $(CaO \cdot Al_2O_3 \cdot 2SiO_2)/4$ | 6 | 5 |
| boron oxide $B_2O_3$ | 4 | 2 |
| silicon dioxide $SiO_2$ | 32 | 50 |
| sum | 100 | 100 |

According to the equations (15, Error! Reference source not found., Error! Reference source not found., Error! Reference source not found., 34), the following property values (rounded) are calculated:

| Property | Core | Surface |
|---|---|---|
| CTE | 4.8 ppm/K | 3.8 ppm/K |
| $E/(1 - \mu)$ | 93.5 GPa | 90.1 GPa |
| $T_G$ | 597° C. | 612° C. |
| VA | 1213° C. | 1268° C. |

| Property | Core | Surface |
|---|---|---|
| $\sigma_0$ | When in (10) for $E/(1 - \mu)$ and $T_G$ the values of the core material and for $\Delta$CTE the difference between the here obtained values of the core and the surface are used, then for the value of the compressive prestress at the surface the following is obtained: | 55.2 MPa |

Example 3

Example 3 is a boro-aluminosilicate glass which has been manufactured as tube with the outer diameter of 10.75 mm and the wall thickness of 0.50 mm and the composition of which at the outer side has been determined by TOF-SIMS.

The values of the compositions in the core have been equated with the results of a chemical analysis so that a normalization of the TOF-SIMS measuring values was achieved. From that follows, expressed in constituent phases (rounded):

TABLE 5

| Constituent phase | ~ in the core / % by mol (normalized) | ~at the surface / % by mol (normalized) |
|---|---|---|
| reedmergnerite $(Na_2O \cdot B_2O_3 \cdot 6SiO_2)/8$ | 32 | 14 |
| potassium reedmergnerite $(K_2O \cdot B_2O_3 \cdot 6SiO_2)/8$ | 3 | 4 |
| albite $(Na_2O \cdot Al_2O_3 \cdot 6SiO_2)/8$ | 28 | 33 |
| cordierite $(2MgO \cdot 2Al_2O_3 \cdot 5SiO_2)/9$ | 0 | 0 |
| anorthite $(CaO \cdot Al_2O_3 \cdot 2SiO_2)/4$ | 2 | 2 |
| boron oxide $B_2O_3$ | 6 | 3 |
| silicon dioxide $SiO_2$ | 30 | 44 |
| sum | 101 | 100 |

The deviation of the sum from 100% by mol in the core results from the rounding of the data.

According to the equations (15, Error! Reference source not found., Error! Reference source not found., Error! Reference source not found., 34), the following property values (rounded) are calculated:

| Property | Core | Surface |
|---|---|---|
| CTE | 5.0 ppm/K | 4.2 ppm/K |
| $E/(1 - \mu)$ | 90.1 GPa | 88.0 GPa |
| $T_G$ | 591° C. | 607° C. |
| VA | 1202° C. | 1242° C. |
| $\sigma_0$ | When in (10) for $E/(1 - \mu)$ and $T_G$ the values of the core material and for $\Delta$CTE the difference between the here obtained values of the core and the surface are used, then for the value of the compressive prestress at the surface the following is obtained: | 40.0 MPa |

Example 4

Example 4 is a boro-aluminosilicate glass which has been manufactured as tube with the outer diameter of 40.00 mm and the wall thickness of 1.5 mm and the composition of which at the outer side has been determined by TOF-SIMS.

The values of the compositions in the core have been equated with the results of a chemical analysis so that a normalization of the TOF-SIMS measuring values was achieved. From that follows, expressed in constituent phases (rounded):

TABLE 6

| Constituent phase | ~in the core/ % by mol (normalized) | ~at the surface/ % by mol (normalized) |
|---|---|---|
| reedmergnerite $(Na_2O \cdot B_2O_3 \cdot 6SiO_2)/8$ | 33 | 8 |
| potassium reedmergnerite $(K_2O \cdot B_2O_3 \cdot 6SiO_2)/8$ | 4 | 4 |
| albite $(Na_2O \cdot Al_2O_3 \cdot 6SiO_2)/8$ | 28 | 33 |
| cordierite $(2MgO \cdot 2Al_2O_3 \cdot 5SiO_2)/9$ | 0 | 0 |
| anorthite $(CaO \cdot Al_2O_3 \cdot 2SiO_2)/4$ | 3 | 2 |
| boron oxide $B_2O_3$ | 5 | 3 |
| silicon dioxide $SiO_2$ | 27 | 50 |
| sum | 100 | 100 |

According to the equations (15, Error! Reference source not found., Error! Reference source not found., Error! Reference source not found., 34), the following property values (rounded) are calculated:

| Property | Core | Surface |
|---|---|---|
| CTE | 5.2 ppm/K | 3.9 ppm/K |
| $E/(1 - \mu)$ | 91.1 GPa | 86.7 GPa |
| TG | 592° C. | 6092° C. |
| VA | 1193° C. | 1263° C. |
| $\sigma_0$ | When in (10) for $E/(1 - \mu)$ and $T_G$ the values of the core material and for $\Delta$CTE the difference between the here obtained values of the core and the surface are used, then for the value of the compressive prestress at the surface the following is obtained: | 68.6 MPa |

In the examples 1-4, the composition at the inner surface (inner side of the tubes) has also been measured by TOF-SIMS; wherein here within the scope of measurement errors no differences with respect to the core were revealed.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A glass article, comprising a core glass and a surface glass, wherein the surface glass is present down to a depth of <20 nm and the core glass is present at least in a depth of 500 nm, wherein the core glass is characterized by the following constituent phases of the core glass:

| Constituent phase | Min. (% by mol) | Max. (% by mol) |
|---|---|---|
| reedmergnerite | 10 | 80 |
| potassium reedmergnerite | 0 | 30 |
| albite | 0 | 50 |
| cordierite | 0 | 10 |
| anorthite | 0 | 25 |
| diboron trioxide | 0 | 20 |
| silicon dioxide | 5 | 60; | wherein the surface glass is characterized by the following constituent phases of the surface glass:

| Constituent phase | Min. (% by mol) | Max. (% by mol) |
|---|---|---|
| reedmergnerite | 2 | 60 |
| potassium reedmergnerite | 0 | 40 |
| albite | 0 | 70 |
| cordierite | 0 | 10 |
| anorthite | 0 | 20 |
| diboron trioxide | 0 | 15 |
| silicon dioxide | 6 | 80; | wherein the core glass has a $CTE_K$ calculated according to the following formula (14) in a range of 3.0 to 7.0 ppm/K and the surface glass has a $CTE_O$ calculated according to formula (14) which in comparison to the $CTE_K$ of the core glass calculated according to formula (14) is lower by at least 0.6 ppm/K:

$$CTE_{glass} = \left( \frac{50116.33042 \left( \frac{kJ}{mol} \right)}{\overline{E_{pot}}} - 26.1724514 \right) ppm/K; \quad (35)$$

wherein $\overline{E_{pot}}$ is a depth of potential well.

2. The glass article according to claim 1, wherein the core glass is characterized by the following constituent phases of the core glass:

| Constituent phase | Min. (% by mol) | Max. (% by mol) |
|---|---|---|
| reedmergnerite | 12 | 75 |
| potassium reedmergnerite | 0 | 25 |
| albite | 0.5 | 45 |
| cordierite | 0 | 5 |
| anorthite | 0 | 20 |
| diboron trioxide | 0 | 15 |
| silicon dioxide | 10 | 55; | and wherein the surface glass is characterized by the following constituent phases of the surface glass:

| Constituent phase | Min. (% by mol) | Max. (% by mol) |
|---|---|---|
| reedmergnerite | 2.5 | 55 |
| potassium reedmergnerite | 0 | 35 |
| albite | 1 | 65 |
| cordierite | 0 | 5 |
| anorthite | 0 | 15 |
| diboron trioxide | 0 | 12.5 |
| silicon dioxide | 12 | 75. |

3. The glass article according to claim 1, wherein a ratio of the portion of reedmergnerite in the core glass to the portion of reedmergnerite in the surface glass is in a range of 1.4:1 to 7.0:1.

4. The glass article according to claim 1, wherein a ratio of the portion of silicon dioxide in the surface glass to the portion of silicon dioxide in the core glass is in a range of 1.1:1 to 4.0:1.

5. The glass article according to claim 1, wherein the portion of diboron trioxide in the core glass is at least 0.5% by mol and in the surface glass is at least 0.2% by mol, and wherein a ratio of the portion of diboron trioxide in the core glass to the portion of diboron trioxide in the surface glass is in a range of 1.2:1 to 3.5:1.

6. The glass article according to claim 1, wherein a quotient of a ratio of the portion of reedmergnerite in the core glass and the portion of reedmergnerite in the surface glass on the one hand and a ratio of the portion of diboron trioxide in the core glass and the portion of diboron trioxide in the surface glass on the other hand is in a range of from 0.5:1 to 5:1.

7. The glass article according to claim 1, wherein a ratio of the portion of albite in the surface glass to the portion of albite in the core glass is in a range of 1.02:1 to 2.0:1.

8. The glass article according to claim 1, wherein the portion of a balance of the glass is at most 5% by mol.

9. The glass article according to claim 1, wherein a quotient $Q_K$ of an elastic modulus and a parameter $(1-\mu)$ calculated according to the following formulas (29) and (27) from the composition of the core glass in constituent phases is in a range of 80 GPa to 105 GPa:

$$E = \left( 0.683888667 \left( 2 \cdot (1+\mu) \cdot f \cdot \frac{\overline{E_{pot}} \cdot z}{V_{mol}} \right) - 39.4242404 \right) GPa \quad (29)$$

$$\text{and } \mu = 0.17 + \Delta\mu_f + \Delta\mu_X. \quad (27)$$

10. The glass article according to claim 9, wherein the quotient $Q_O$ of the elastic modulus and the parameter $(1-\mu)$ calculated according to the formulas (29) and (27) from the composition of the surface glass in constituent phases corresponds to the quotient $Q_K \pm 10\%$.

11. The glass article according to claim 1, wherein the processing temperature $VA_K$ calculated according to the following formula (33) from the composition of the core glass in constituent phases is in a range of 1120° C. to 1280° C.:

$$VA = 0.989573825 \cdot \overline{E_{pot}} \cdot \frac{°C.}{kJ/mol} - 387.9923613° C. \quad (33)$$

12. The glass article according to claim 11, wherein the processing temperature $VA_O$ calculated according to formula (33) from the composition of the surface glass in constituent phases corresponds to the processing temperature $VA_K \pm 10\%$.

13. The glass article according to claim 1, wherein an annealing temperature $T_{G(K)}$ calculated according to the following formula (35) from the composition of the core glass in constituent phases is in a range of 540° C. to 650° C.:

$$\frac{1}{VA - T_G} = (0.002665819 \cdot f_W + 0.001119212) \cdot \frac{1}{K}. \quad (35)$$

14. The glass article according to claim 13, wherein the annealing temperature $T_{G(O)}$ calculated according to formula (35) from the composition of the surface glass in constituent phases corresponds to the annealing temperature $T_{G(K)}$ ±10%.

15. The glass article according to claim 1, wherein a compressive prestress at the surface $\sigma_O$ calculated according to the following formula (10) is in a range of 25 to 85 MPa:

$$\sigma_O = \frac{E}{1-\mu} \cdot (T_G - T_{ambient}) \cdot \Delta CTE; \quad (10)$$

wherein a quotient of an elastic modulus and a parameter (1-μ) is calculated according to the following formulas (29) and (27) from the composition of the core glass in constituent phases:

$$E = \left(0.683888667\left(2 \cdot (1+\mu) \cdot f \cdot \frac{\overline{E_{pot}} \cdot z}{V_{mol}}\right) - 39.4242404\right) \text{GPa} \quad (29)$$

and $\mu = 0.17 + \Delta\mu_f + \Delta\mu_\chi$ (27); wherein an annealing temperature $T_G$ is calculated according to the following formula (35) from the composition of the core glass in constituent phases:

$$\frac{1}{VA - T_G} = (0.002665819 \cdot f_W + 0.001119212) \cdot \frac{1}{K}; \quad (35)$$

wherein $\Delta CTE$ is calculated as the difference between a $CTE_K$ calculated according to formula (14) and a $CTE_O$ calculated according to formula (14), and wherein $T_{ambient} = 25°$ C. is assumed.

16. The glass article according to claim 1, wherein the article has an inner surface and an outer surface, and wherein the surface glass is localized at the outer surface.

17. The glass article according to claim 1, wherein the glass article is a glass tube or a pharmaceutical container.

18. The glass article according to claim 17, wherein the glass article has an outer diameter in a range of from 5 to 75 mm.

19. The glass article according to claim 17, wherein the glass article has a wall thickness in a range of from 0.1 to 3.0 mm.

20. The glass article according to claim 19, wherein a ratio of outer diameter to wall thickness is in a range of from 10:1 to 50:1.

* * * * *